United States Patent
Zhang et al.

(10) Patent No.: US 12,500,632 B2
(45) Date of Patent: Dec. 16, 2025

(54) COMMUNICATION METHOD AND APPARATUS

(71) Applicant: Huawei Technologies Co., Ltd., Shenzhen (CN)

(72) Inventors: Didi Zhang, Shenzhen (CN); Shibin Ge, Shanghai (CN); Yiling Yuan, Shanghai (CN); Junhui Gao, Shanghai (CN); Li Fan, Shanghai (CN); Huangping Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/615,384

(22) Filed: Mar. 25, 2024

(65) Prior Publication Data

US 2024/0235628 A1  Jul. 11, 2024

Related U.S. Application Data

(63) Continuation of application No. PCT/CN2022/116844, filed on Sep. 2, 2022.

(30) Foreign Application Priority Data

Sep. 26, 2021 (CN) .......................... 202111130304.6

(51) Int. Cl.
- *H04L 5/12* (2006.01)
- *H04B 7/0456* (2017.01)
- *H04B 7/06* (2006.01)

(52) U.S. Cl.
CPC ......... *H04B 7/0456* (2013.01); *H04B 7/0626* (2013.01)

(58) Field of Classification Search
CPC .... H04B 7/0456; H04B 7/0626; H04B 7/048; H04B 7/0478; H04L 5/0048
(Continued)

(56) References Cited

U.S. PATENT DOCUMENTS

| | | | |
|---|---|---|---|
| 2011/0170497 A1* | 7/2011 | Lin | H04L 5/0023 370/329 |
| 2021/0273692 A1* | 9/2021 | Gao | H04B 7/0456 |
| 2023/0361836 A1* | 11/2023 | Yuan | H04B 7/0617 |

OTHER PUBLICATIONS

3rd Generation Partnership Project; Technical Specification Group Radio Access Network; NR; Physical layer procedures for data (Release 16). 3GPP TS 38.214 V16.6.0 (Jun. 2021), total 172 pages.

(Continued)

*Primary Examiner* — Helene E Tayong
(74) *Attorney, Agent, or Firm* — Slater Matsil, LLP

(57) ABSTRACT

In accordance with an embodiment, a method includes receiving first indication information from a network device, where the first indication information indicates a first parameter combination including at least two of the following: a first value of $M_v$, a first value of $\beta$, and a first value of $\alpha$. The first parameter combination is configured to be used to determine a a maximum of $K_0$ non-zero elements for a first coefficient matrix, and $K_0$ is determined based on the first values of $M_v$, $\beta$, and $\alpha$; sending a second information indication to the network device, where the second indication information indicates $K_2$ non-zero elements in the first coefficient matrix, and $K_2$ is less than or equal to $K_0$.

30 Claims, 2 Drawing Sheets

(58) Field of Classification Search
USPC .......................................................... 375/262
See application file for complete search history.

(56) References Cited

OTHER PUBLICATIONS

CATT: "Discussion on CSI enhancements for Rel-17", 3GPP Draft; R1-2106941, 3rd Generation Partnership Project (3GPP), Mobile Competence Centre ; 650, Route Deslucioles F-06921 Sophia-Antipolis Cedex; France vol. RAN WG1, No. e-Meeting; Aug. 16, 2021 Aug. 27, 2021 Aug. 7, 2021 (Aug. 7, 2021), XP052038114, total 23 pages.

Qualcomm Incorporated: "CSI enhancements: MTRP and FR1 FDD reciprocity", 3GPP Draft; R1-2107329, 3rd GenerationPartnership Project (3GPP), Mobile Competence Centre; 650, Route Deslucioles F-06921 Sophia-Antipolis Cedex; France vol. RAN WG1, No. e-Meeting; Aug. 16, 2021 Aug. 27, 2021 Aug. 7, 2021 (Aug. 7, 2021), XP052038281, total 15 pages.

Samsung: "Views on Rel-17 CSI enhancements", 3GPP Draft; R1-2106871, 3rd Generation Partnership Project (3GPP), Mobile Competence Centre; 650, Route Deslucioles; F-06921 Sophia-Antipolis Cedex; France vol. RAN WG1, No. e-Meeting; Aug. 16, 2021 Aug. 27, 2021 Aug. 6, 2021 (Aug. 6, 2021), XP052038075, total 26 pages.

* cited by examiner

COMMUNICATION METHOD AND APPARATUS

CROSS-REFERENCE TO RELATED APPLICATIONS

This application is a continuation of International Application No. PCT/CN2022/116844, filed on Sep. 2, 2022, which claims priority to Chinese Patent Application No. 202111130304.6, filed on Sep. 26, 2021. The disclosures of the aforementioned applications are hereby incorporated by reference in their entireties.

TECHNICAL FIELD

Embodiments of this application relate to the fields of communication and the like, and in particular, to a communication method and an apparatus.

BACKGROUND

Currently, according to a standard progress of Release 17 (R17), a maximum quantity of non-zero elements in a coefficient matrix that are allowed to be reported by a terminal device is $K_0 = \lceil \beta K_1 M_v \rceil$. There are approximately seven values of $K_1$, approximately two values of $M_v$, and approximately four values of $\beta$. In this way, there are approximately 7*2*4=56 possible parameter combinations of a ternary parameter combination ($\beta$, $K_1$, $M_v$). The plurality of parameter combinations cause large overheads of configuring the parameter combination to the terminal device by a network device.

SUMMARY

Embodiments of this application provide a communication method and an apparatus, to reduce overheads of configuring a parameter combination to a terminal device by a network device.

According to a first aspect, a communication method is provided. The method may be performed by a terminal device, or may be a component used in a terminal device, for example, a chip or a processor. The following uses an example in which the method is performed by the terminal device for description. First, the terminal device receives first indication information from a network device, where the first indication information indicates a first parameter combination, the first parameter combination is one of a plurality of parameter combinations, a quantity of the plurality of parameter combinations is less than 24, and each parameter combination includes values of at least two parameters in $M_v$, $\beta$, and $\alpha$. The first parameter combination includes at least two of the following: a first value of $M_v$, a first value of $\beta$, and a first value of $\alpha$. The first parameter combination is for determining that a first coefficient matrix to be indicated by the terminal device includes a maximum of $K_0$ non-zero elements, and $K_0$ is determined based on the first value of $M_v$, the first value of $\beta$, and the first value of $\alpha$. The first value of $\alpha$ is for determining a quantity of rows of the first coefficient matrix, the first value of $M_v$ is a quantity of columns of the first coefficient matrix, the first value of $\beta$ is a proportion of non-zero elements to all elements in the first coefficient matrix, and the first coefficient matrix is for determining a precoding matrix. Then, the terminal device sends second indication information to the network device, where the second indication information indicates $K_2$ non-zero elements in the first coefficient matrix, and $K_2$ is less than or equal to $K_0$, and the indication information is determined based on a downlink reference signal from the network device.

A smaller quantity of the plurality of parameter combinations indicates a smaller quantity of bits needed when the network device configures the first parameter combination to the terminal device. For example, at least six bits are needed for indicating 56 parameter combinations, and only five bits are needed for indicating 24 parameter combinations, so that one bit is saved.

In a possible implementation, the terminal device may further receive third indication information from the network device, where the third indication information indicates a first quantity of ports used by the network device to send a downlink reference signal. In this way, a proper quantity of ports can be selected with reference to different communication scenarios, to better meet a communication requirement.

According to a second aspect, a communication method is provided. The method may be performed by a network device, or may be a component used in a network device, for example, a chip or a processor. The following uses an example in which the method is performed by the network device for description. First, the network device sends first indication information to a terminal device, where the first indication information indicates a first parameter combination, the first parameter combination is one of a plurality of parameter combinations, a quantity of the plurality of parameter combinations is less than 24, and each parameter combination includes values of at least two parameters in $M_v$, $\beta$, and $\alpha$. The first parameter combination includes at least two of the following: a first value of $M_v$, a first value of $\beta$, and a first value of $\alpha$. The first parameter combination is for determining that a first coefficient matrix to be indicated by the terminal device includes a maximum of $K_0$ non-zero elements, and $K_0$ is determined based on the first value of $M_v$, the first value of $\beta$, and the first value of $\alpha$. The first value of $\alpha$ is for determining a quantity of rows of the first coefficient matrix, the first value of $M_v$ is a quantity of columns of the first coefficient matrix, the first value of $\beta$ is a proportion of non-zero elements to all elements in the first coefficient matrix, and the first coefficient matrix is for determining a precoding matrix. Then, the network device receives second indication information from the terminal device, where the second indication information indicates $K_2$ non-zero elements in the first coefficient matrix, $K_2$ is less than or equal to $K_0$, and the indication information is determined based on a downlink reference signal from the network device.

A smaller quantity of the plurality of parameter combinations indicates a smaller quantity of bits needed when the network device configures the first parameter combination to the terminal device. For example, at least six bits are needed for indicating 56 parameter combinations, and only five bits are needed for indicating 24 parameter combinations, so that one bit is saved.

In a possible implementation, the network device may further send third indication information to the terminal device, where the third indication information indicates a first quantity of ports used by the network device to send a downlink reference signal. In this way, a proper quantity of ports can be selected with reference to different communication scenarios, to better meet a communication requirement.

The following possible implementations are applicable to both the first aspect and the second aspect.

In a possible implementation, $K_0$ is determined based on the first value of $M_v$, the first value of $\beta$, and a first value of $K_1$, the first value of $K_1$ is the quantity of rows of the first coefficient matrix, and the first value of $K_1$ is determined based on the first value of $\alpha$.

In a possible implementation, the first value of $K_1$ is determined based on the first value of $\alpha$ and a first value of P, and the first value of P is the first quantity of ports used by the network device to send the downlink reference signal.

In a possible implementation, a value set of a quantity P of ports is P={4,8,12,16,24,32}, and a value of the first quantity belongs to the value set of the quantity P of ports.

In a possible implementation, the first value of $K_1$ is a value of $K_1$ that is greater than or equal to $\alpha*P$ and for which an absolute value of a difference between $\alpha*P$ and $K_1$ is the smallest in a value set of $K_1$; or the first value of $K_1$ is a value of $K_1$ that is less than or equal to $\alpha*P$ and for which an absolute value of a difference between $\alpha*P$ and $K_1$ is the smallest in a value set of $K_1$, where in these determining manners, it can be ensured that the determined value of $K_1$ is still a value of $K_1$ in the existing value set; or the first value of $K_1$ satisfies a formula: $K_1=\lceil \alpha*P \rceil$, where $\lceil\ \rceil$ represents rounding up, and in this determining manner, a relationship between P and $K_1$ can be simplified, so that a process of determining $K_1$ is simpler.

In a possible implementation, the quantity of the plurality of parameter combinations is 8.

In a possible implementation, the first parameter combination is: $M_v=1$, $\alpha=0.75$, and $\beta=0.5$; $M_v=1$, $\alpha=1$, and $\beta=0.5$; $M_v=1$, $\alpha=1$, and $\beta=0.75$; $M_v=1$, $\alpha=1$, and $\beta=1$; $M_v=2$, $\alpha=0.5$, and $\beta=0.5$; $M_v=2$, $\alpha=0.75$, and $\beta=0.5$; $M_v=2$, $\alpha=1$, and $\beta=0.5$; or $M_v=2$, $\alpha=1$, and $\beta=0.75$.

In a possible implementation, when the first parameter combination is $M_v=2$, $\alpha=1$, and $\beta=0.75$, the first quantity of ports used by the network device to send the downlink reference signal is less than 32.

In a possible implementation, the plurality of parameter combinations include at least one of the following: $M_v=1$, $\alpha=0.75$, and $\beta=0.5$; $M_v=1$, $\alpha=1$, and $\beta=0.5$; $M_v=1$, $\alpha=1$, and $\beta=0.75$; $M_v=1$, $\alpha=1$, and $\beta=1$; $M_v=2$, $\alpha=0.5$, and $\beta=0.5$; $M_v=2$, $\alpha=0.75$, and $\beta=0.5$; $M_v=2$, $\alpha=1$, and $\beta=0.5$; and $M_v=2$, $\alpha=1$, and $\beta=0.75$.

In a possible implementation, a quantity, corresponding to the parameter combination $M_v=2$, $\alpha=1$, and $\beta=0.75$ of ports used by the network device to send the downlink reference signal is less than 32.

In a possible implementation, in the plurality of parameter combinations, values of $\beta*\alpha$ corresponding to a plurality of parameter combinations in which $M_v$ has a same value are different.

In a possible implementation, in the plurality of parameter combinations, a plurality of parameter combinations in which $M_v=1$ include at least two parameter combinations in which a value of $\beta$ is 1 or a value of $\alpha$ is 1.

In a possible implementation, the plurality of parameter combinations are associated with values of at least two ranks. This controls feedback overheads of terminals of different ranks and is applicable to a plurality of communication requirements.

In a possible implementation, a value of $\beta$ in a parameter combination when a rank is greater than 2 is less than or equal to a value of $\beta$ in a parameter combination when a rank is less than or equal to 2; and/or a value of $\alpha$ in a parameter combination when a rank is greater than 2 is less than or equal to a value of $\alpha$ in a parameter combination when a rank is less than or equal to 2. In this way, reporting overheads of a terminal in a high rank can be controlled.

In a possible implementation, in the plurality of parameter combinations, a value set of $\alpha$ is $\alpha=\{0.25,0.5,0.75,1\}$.

In a possible implementation, in the plurality of parameter combinations, a value set of $\beta$ is $\beta=\{0.5,0.75,1\}$, a value set of $\alpha$ is $\alpha=\{0.5,0.75,1\}$, and a value set of $M_v$ is $M_v=\{1,2\}$; a value set of $\beta$ is $\beta=\{0.5,0.75,1\}$, a value set of $\alpha$ is $\alpha=\{0.75,1\}$, and a value set of $M_v$ is $M_v=\{1,2\}$; a value set of $\beta$ is $\beta=\{0.5,0.75,1\}$, a value set of $\alpha$ is $\alpha=\{0.5,1\}$, and a value set of $M_v$ is $M_v=\{1,2\}$; a value set of $\beta$ is $\beta=\{0.75,1\}$, a value set of $\alpha$ is $\alpha=\{0.5,0.75,1\}$, and a value set of $M_v$ is $M_v=\{1,2\}$; or a value set of $\beta$ is $\beta=\{0.5,1\}$, a value set of $\alpha$ is $\alpha=\{0.5,0.75,1\}$, and a value set of $M_v$ is $M_v=\{1,2\}$.

In this application, a ternary parameter combination ($\alpha$, $\beta$, $M_v$) that is determined based on the ternary parameter combination ($\alpha$, $\beta$, $M_v$) and that has a small maximum quantity of non-zero elements is deleted, so that system performance can be improved, and a total quantity of parameter combinations of the ternary parameter combination can be effectively reduced, to reduce overheads of indicating the first parameter combination by the network device to the terminal device. These possible parameter combinations are applicable to all ranks. Alternatively, these possible parameter combinations are applicable only when rank=1 or rank=2.

In a possible implementation, in the plurality of parameter combinations: $M_v=\{1,2\}$, $\alpha=\{0.5,0.75,1\}$, $\beta2=\{0.25,0.5,0.75,1\}$, and $\beta1=\{0.125,0.375,0.625,0.875\}$; $M_v=\{1,2\}$, $\alpha=\{0.5,0.75,1\}$, $\beta2=\{0.25,0.5,0.75,1\}$, and $\beta1=\{0.125,0.25,0.375,0.5\}$; $M_v=\{1,2\}$, $\alpha=\{0.5,0.75,1\}$, $\beta2=\{0.25,0.5,0.75,1\}$, and $\beta1=\{0.125,0.25,0.5,0.75\}$; $M_v=\{1,2\}$, $\alpha=\{0.5,1\}$, $\beta2=\{0.25,0.5,0.75,1\}$, and $\beta1=\{0.125,0.375,0.625,0.875\}$; $M_v=\{1,2\}$, $\alpha=\{0.5,1\}$, $\beta2=\{0.25,0.5,0.75,1\}$, and $\beta1=\{0.125,0.25,0.375,0.5\}$; $M_v=\{1,2\}$, $\alpha=\{0.5,1\}$, $\beta2=\{0.25,0.5,0.75,1\}$, and $\beta1=\{0.125,0.25,0.5,0.75\}$; $M_v=\{1,2\}$, $\alpha=\{0.75,1\}$, $\beta2=\{0.25,0.5,0.75,1\}$, and $\beta1=\{0.125,0.375,0.625,0.875\}$; $M_v=\{1,2\}$, $\alpha=\{0.75,1\}$, $\beta2=\{0.25,0.5,0.75,1\}$, and $\beta1=\{0.125,0.25,0.375,0.5\}$; or $M_v=\{1,2\}$, $\alpha=\{0.75,1\}$, $\beta2=\{0.25,0.5,0.75,1\}$, and $\beta1=\{0.125,0.25,0.5,0.75\}$, where $\beta2$ is $\beta$ that is applicable when rank=1 or rank=2, and $\beta1$ is $\beta$ that is applicable when the rank is greater than 2.

In a possible implementation, in the plurality of parameter combinations: $M_v=\{1,2\}$, $\beta=\{0.25,0.5,0.75,1\}$, $\alpha2=\{0.5,0.75,1\}$, and $\alpha1=\{0.375,0.625,0.875\}$; $M_v=\{1,2\}$, $\beta=\{0.5,0.75,1\}$, $\alpha2=\{0.5,0.75,1\}$, and $\alpha1=\{0.375,0.625,0.875\}$; $M_v=\{1,2\}$, $\beta=\{0.25,0.5,0.75,1\}$, $\alpha2=\{0.5,0.75,1\}$, and $\alpha1=\{0.25,0.375,0.5\}$; or $M_v=\{1,2\}$, $\beta=\{0.5,0.75,1\}$, $\alpha2=\{0.5,0.75,1\}$, and $\alpha1=\{0.25,0.375,0.5\}$, where $\alpha2$ is $\alpha$ that is applicable when rank=1 or rank=2, and $\alpha1$ is $\alpha$ that is applicable when the rank is greater than 2.

In a possible implementation, the plurality of parameter combinations include at least two of the following: $M_v=1$, $\alpha=1$, and $\beta=1$; $M_v=1$, $\alpha=1$, and $\beta=0.75$; $M_v=1$, $\alpha=1$, and $\beta=0.5$; $M_v=1$, $\alpha=0.5$, and $\beta=0.75$; $M_v=1$, $\alpha=0.5$, and $\beta=0.5$; $M_v=1$, $\alpha=0.5$, and $\beta=0.25$; $M_v=2$, $\alpha=1$, and $\beta=0.75$; or $M_v=2$, $\alpha=1$, and $\beta=0.5$. These possible parameter combinations are applicable to all ranks. Alternatively, these possible parameter combinations are applicable only when rank=1 or rank=2.

In a possible implementation, the plurality of parameter combinations include at least two of the following: $M_v=1$, $\alpha=1$, and $\beta=0.875$; $M_v=1$, $\alpha=1$, and $\beta=0.625$; $M_v=1$, $\alpha=1$, and $\beta=0.375$; $M_v=1$, $\alpha=0.5$, and $\beta=0.625$; $M_v=1$, $\alpha=0.5$, and $\beta=0.375$; $M_v=1$, $\alpha=0.5$, and $\beta=0.125$; $M_v=2$, $\alpha=1$, and $\beta=0.625$; $M_v=2$, $\alpha=1$, and $\beta=0.375$; $M_v=1$, $\alpha=1$, and $\beta=0.5$; $M_v=1$, $\alpha=1$, and $\beta=0.25$; $M_v=1$, $\alpha=0.5$, and $\beta=0.25$; $M_v=2$, $\alpha=1$, and $\beta=0.25$; $M_v=1$, $\alpha=1$, and $\beta=0.75$; or $M_v=1$, $\alpha=0.5$, and β=0.5, where the plurality of parameter combinations are applicable when the rank is greater than 2.

According to a third aspect, a communication apparatus is provided. The apparatus has a function of implementing any one of the first aspect and the possible implementations of the first aspect, or a function of implementing any one of the second aspect and the possible implementations of the second aspect. The functions may be implemented by hardware, or may be implemented by hardware by executing corresponding software. The hardware or software includes one or more function modules corresponding to the foregoing function.

According to a fourth aspect, a communication apparatus is provided, including a processor, and optionally, further including a memory, where the processor is coupled to the memory. The memory is configured to store computer programs or instructions; the processor is configured to execute some or all of the computer programs or instructions in the memory, and when the some or all of the computer programs or instructions are executed, the processor is configured to implement functions of the terminal device in the method according to any one of the first aspect and the possible implementations of the first aspect, or implement functions of the network device in any one of the second aspect and the possible implementations of the second aspect.

In a possible implementation, the apparatus may further include a transceiver, and the transceiver is configured to transmit a signal processed by the processor, or receive a signal input to the processor. The transceiver may perform a transmitting action or a receiving action performed by the terminal device in any one of the first aspect and the possible implementations of the first aspect, or perform a transmitting action or a receiving action performed by the network device in any one of the second aspect and the possible implementations of the second aspect.

According to a fifth aspect, this application provides a chip system, and the chip system includes one or more processors (which may also be referred to as processing circuits). The processor is electrically coupled to a memory (which may also be referred to as a storage medium); the memory may be located in the chip system, or may not be located in the chip system; the memory is configured to store computer programs or instructions; and the processor is configured to execute some or all of the computer programs or instructions in the memory, and when the some or all of the computer programs or instructions are executed, the processor is configured to implement functions of the terminal device in the method according to any one of the first aspect and the possible implementations of the first aspect, or implement functions of the network device in any one of the second aspect and the possible implementations of the second aspect.

In a possible implementation, the chip system may further include an input/output interface (which may also be referred to as a communication interface). The input/output interface is configured to: output a signal processed by the processor, or receive a signal input to the processor. The input/output interface may perform a transmitting action or a receiving action performed by the terminal device in any one of the first aspect and the possible implementations of the first aspect, or perform a transmitting action or a receiving action performed by the network device in any one of the second aspect and the possible implementations of the second aspect. Specifically, the output interface performs the transmitting action, and the input interface performs the receiving action.

In a possible implementation, the chip system may include a chip, or may include a chip and another discrete device.

According to a sixth aspect, a computer-readable storage medium is provided, and is configured to store a computer program. The computer program includes instructions used for implementing functions in any one of the first aspect and the possible implementations of the first aspect, or instructions used for implementing functions in any one of the second aspect and the possible implementations of the second aspect.

Alternatively, a computer-readable storage medium is configured to store a computer program. When the computer program is executed by a computer, the computer may be enabled to perform the method performed by the terminal device in the method according to any one of the first aspect and the possible implementations of the first aspect, or perform the method performed by the network device in any one of the second aspect and the possible implementations of the second aspect.

According to a seventh aspect, a computer program product is provided. The computer program product includes computer program code. When the computer program code is run on a computer, the computer is enabled to perform the method performed by the terminal device in any one of the first aspect and the possible implementations of the first aspect, or perform the method performed by the network device in any one of the second aspect and the possible implementations of the second aspect.

According to an eighth aspect, a communication system is provided. The communication system includes the terminal device for performing the method according to any one of the first aspect and the possible implementations of the first aspect and the network device for performing the method according to any one of the second aspect and the possible implementations of the second aspect.

For technical effects in the third aspect to the eighth aspect, refer to descriptions in the first aspect to the second aspect. Details are not repeated herein.

DETAILED DESCRIPTION OF THE EMBODIMENTS

To facilitate understanding of technical solutions in embodiments of this application, the following briefly describes a system architecture of a method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions in embodiments of this application are applied to various communication systems, for example, a satellite communication system and a conventional mobile communication system. The satellite communication system may be integrated with the conventional mobile communication system (namely, a terrestrial communication system). For example, the communication system is a wireless local area network (WLAN) communication system, a wireless fidelity (Wi-Fi) system, a long term evolution (LTE) system, an LTE frequency division duplex (FDD) system, an LTE time division duplex (TDD) system, a 5th generation (5G) system or a new radio (NR) system, a 6th generation (6G) system, or another future communication system. The communication system further supports a communication system integrating a plurality of wireless technologies, for example, may also be applied to a system that integrates a non-terrestrial network (NTN) and a terrestrial mobile communication network, such as an unmanned aerial vehicle, a satellite communication system, and high altitude platform station (HAPS) communication.

Figure 1:
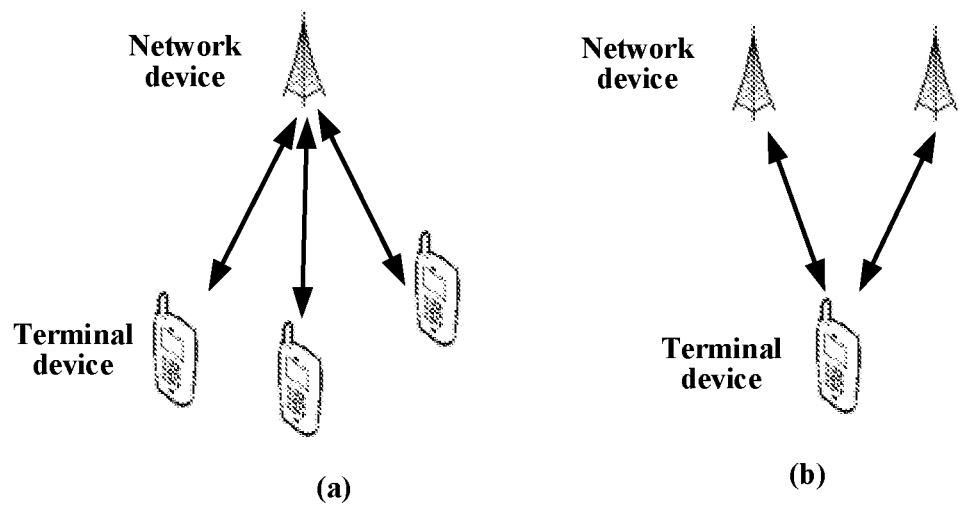
FIG. 1 is a schematic diagram of an architecture of a communication system according to an embodiment of this application.

FIG. 1 is an example of a communication system applicable to an embodiment of this application. Refer to FIG. 1. The communication system includes at least one network device and at least one terminal. A single network device may transmit data or control signaling to a single terminal device or a plurality of terminal devices (for example, as shown in (a)). Alternatively, a plurality of network devices may simultaneously transmit data or control signaling to a single terminal device (for example, as shown in (b)).

The network device in this application may be an evolved base station (evolved NodeB, eNB or eNodeB) in LTE, or a base station, a broadband network gateway (BNG), an aggregation switch, a non-3rd generation partnership project (3GPP) access device, or the like in a 5G network. This is not specifically limited in embodiments of this application. Optionally, the base station in embodiments of this application may include base stations in various forms, for example, a macro base station, a micro base station (also referred to as a small cell), a relay station, an access point, a next-generation NodeB (gNodeB, gNB), a transmission reception point (TRP), a transmission point (TP), a mobile switching center, and a device that functions as a base station in device-to-device (Device-to-Device, D2D), vehicle-to-everything (V2X), machine-to-machine (M2M) communication, or internet of things (Internet of Things) communication. This is not specifically limited in embodiments of this application.

The network device may communicate and interact with a core network device, to provide a communication service for the terminal device. The core network device is, for example, a device in a 5G network core network (CN). As a bearer network, the core network provides an interface to a data network, provides communication connection, authentication, management, and policy control for user equipment (UE), bears data services, and the like.

The terminal mentioned in embodiments of this application may be a device having a wireless transceiver function, and may be specifically user equipment (UE), an access terminal, a subscriber unit, a subscriber station, a mobile station, a remote station, a remote terminal, a mobile device, a user terminal, a wireless communication device, a user agent, or a user apparatus. Alternatively, the terminal device may be a satellite phone, a cellular phone, a smartphone, a wireless data card, a wireless modem, a machine type communication device, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a communication device carried on a high-altitude aircraft, a wearable device, an unmanned aerial vehicle, a robot, a terminal in device-to-device (D2D) communication, a terminal in vehicle-to-everything (V2X), a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a terminal device in a future communication network, or the like. This is not limited in this application.

For ease of understanding embodiments of this application, the following describes an application scenario of this application. A network architecture and a service scenario described in embodiments of this application are intended to describe the technical solutions in embodiments of this application more clearly, and do not constitute any limitation on the technical solutions provided in embodiments of this application. Persons of ordinary skill in the art may learn that, as a new service scenario emerges, the technical solutions provided in embodiments of this application are also applicable to a similar technical problem.

A 5G mobile communication system imposes higher requirements on a system capacity, spectral efficiency, a transmission delay, and the like. As one of key technologies of 5G, a massive (Massive) multiple-input multiple-output (MIMO) antenna technology can effectively improve the system capacity through spatial multiplexing. In addition, a directional beam may further be formed in massive MIMO by using a beamforming technology, to help reduce a link transmission loss and improve link reliability.

A key factor for improving downlink capacities of a plurality of systems is that the network device obtains accurate downlink channel state information (CSI).

In a time division duplex (TDD) system, after channel calibration, because there is channel reciprocity between uplink and downlink, the network device may estimate downlink channel state information (CSI) by using an uplink sounding reference signal (SRS) sent by the terminal device. If a channel in the time division duplex (TDD) system is not calibrated or a calibration error is large, uplink and downlink equivalent baseband channels between the network device and the terminal device do not have reciprocity, and the downlink channel state information (CSI) needs to be fed back by the terminal device to the network device.

In a frequency division duplex (FDD) system, there is a difference between uplink and downlink frequencies (for example, uplink 2.1 GHz and downlink 3.5 GHz), and the uplink and downlink frequencies do not have channel reciprocity. The downlink channel state information (CSI) can be fed back only by the terminal device to the network device.

Figure 2:
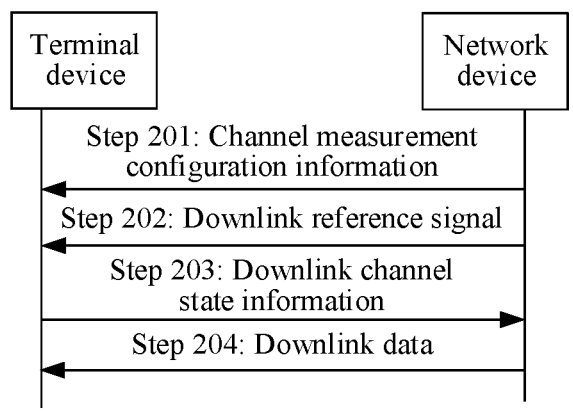
FIG. 2 is a schematic flowchart of feeding back downlink channel state information according to an embodiment of this application.

FIG. 2 is a schematic flowchart of a downlink channel state information (CSI) feedback procedure, including the following steps.

Step 201: A network device sends channel measurement configuration information to a terminal device.

For example, the channel measurement configuration information includes a time-frequency resource used for channel measurement.

Step 202: The network device sends, to the terminal device, a downlink reference signal used for channel measurement.

For example, the downlink reference signal includes a downlink channel state information reference signal (CSI-RS).

The terminal device receives the downlink reference signal based on the channel measurement configuration information.

Step 203: The terminal device estimates downlink channel state information (CSI) based on the received downlink reference signal, and feeds back the downlink channel state information to the network device.

The downlink channel state information (CSI) includes a rank indication (RI), a channel quality indication (CQI), a precoding matrix indication (PMI), and the like.

The RI indicates a quantity of valid data layers of a channel, and notifies the network device of a quantity of code words (CWs) that can be supported by UE. For example, if RI=1, one CW is supported; or if RI>1, two CWs are supported.

The CQI reflects channel quality of a downlink channel. For example, 0 to 15 represent the channel quality, where o indicates the worst channel quality, and 15 indicates the best channel quality. The network device learns of current quality of the downlink channel by obtaining a CQI value, and may select a proper channel for scheduling.

The PMI is for determining a precoding matrix. For example, the PMI includes information about a coefficient matrix. Simply, precoding is to multiply data by a precoding matrix. The precoding matrix is obtained by multiplying a plurality of matrices, and a matrix in the plurality of matrices is referred to as a coefficient matrix.

Step 204: The network device determines, based on the downlink channel state information (CSI) fed back by the terminal device, precoding information corresponding to downlink data transmission, and sends downlink data based on the precoding information.

For example, the network device determines a quantity of data streams of downlink transmission based on RI information fed back by the UE; determines a modulation order of the downlink data based on CQI information fed back by the UE; and determines a precoding matrix for downlink data transmission based on a PMI fed back by the UE.

In R16, precoding (which may also be referred to as a precoding matrix) may be represented in the following form:

$$W = W_1 \tilde{W}_2 W_f^H$$

The matrix W includes $P_{CSI-RS}$ rows and $N_3$ columns. $W_1 \in N^{P_{CSI-RS} \times L}$, $W_1$ is a port selection matrix, and represents that L ports are selected from $P_{CSI-RS}$ ports. $\tilde{W}_2 \in \mathbb{C}^{L \times M}$, and $\tilde{W}_2$ is a coefficient matrix corresponding to the L CSI-RS ports selected by the terminal device. $W_f \in \mathbb{C}^{N_3 \times M}$, $W_f$ is a frequency domain base matrix, $W_f$ represents M columns selected from a discrete Fourier transform (DFT) matrix set, and $N_3$ is a quantity of frequency domain resource blocks (RBs) or a quantity of sub-bands.

R16 specifies that the terminal device reports one matrix $\tilde{W}_2$ for each layer. A maximum quantity of non-zero elements in each matrix $\tilde{W}_2$ is $K_0 = \lceil \beta LM \rceil$.

A set of values to which L can be set is L={2,4,6}.

When v is 1 or 2, a set of values to which a scaling factor $P_v$ can be set is $P_v=\{1/4, 1/2\}$; or when v is 3 or 4, a set of values to which $P_v$ can be set is $P_v=\{1/4, 1/8\}$. The subscript v represents an index of a quantity of layers, a value of M is determined based on $P_v$, and one value of $P_v$ corresponds to one value of M.

A set of values to which β can be set is {1/4, 1/2, 3/4}, and β represents a proportion of non-zero elements in the matrix $\tilde{W}_2$.

In cases of these value sets, a ternary parameter combination (β, L, M) has 3*2*3=18 parameter combination cases. To reduce overheads of configuring a parameter combination to the terminal device by the network device and impact of other factors, eight combination cases of the ternary parameter combination (β, L, M) are specified in R16.

Precoding (which may also be referred to as a precoding matrix) in R17 may be represented in the following form:

$$W = W_1 \tilde{W}_2 W_f^H$$

The W matrix includes $P_{CSI-RS}$ rows and $N_3$ columns. $W_1 \in \mathbb{N}^{P_{CSI-RS} \times K_1}$, $W_1$ is a port selection matrix, and represents that $K_1$ ports are selected from $P_{CSI-RS}$ ports, and each column in $W_1$ has only one non-zero element whose value is 1. $\tilde{W}_2 \in \mathbb{C}^{K_1 \times M_v}$, and $\tilde{W}_2$ is a coefficient matrix corresponding to the $K_1$ CSI-RS ports selected by the terminal device. $W_f \in \mathbb{C}^{N_3 \times M_v}$, $W_f$ is a frequency domain base matrix, $W_f$ represents $M_v$ columns selected from a discrete Fourier transform (DFT) matrix set, the subscript v represents an index of a quantity of layers, and $N_3$ is a quantity of frequency domain RB resources or a quantity of sub-bands. Usually, a right corner mark "H" represents conjugate transposition. A matrix $A^H$ obtained through the conjugate transposition is referred to as a conjugate transposition matrix of A, and $A^H$ is of an n*m type. For example, conjugation is performed on each element $a_{ij}$ in A to obtain $b_{ij}$ first (where a product of two mutually conjugate complex numbers is equal to a square of a modulus of the complex number, and the conjugation is usually represented by a right corner mark "*"), and a newly obtained m*n-type matrix including $b_{ij}$ is denoted as a matrix B, where B=A*; and then a common transposition is performed on the matrix B to obtain $B^T$, that is, the conjugate transposition matrix of A: $B^T=A^H$.

The network device may configure a value of $P_{CSI-RS}$ and a value of $K_1$ to the terminal device, for example, by using one or more of radio resource control (RCC), a medium access control control element (MAC CE), or downlink control information (DCI). The value of $P_{CSI-RS}$ and the value of $K_1$ may alternatively be agreed on in a protocol. The terminal device may select the $K_1$ ports from the $P_{CSI-RS}$ ports, and notify the network device of which ports the selected $K_1$ ports are. In this way, the network device can obtain the matrix $W_1$.

The network device may configure, to the terminal device, a parameter combination (β, $K_1$, $M_v$) corresponding to the maximum quantity $K_0 = \lceil \beta K_1 M_v \rceil$ of non-zero elements in the matrix $\tilde{W}_2$. The terminal device may determine the maximum quantity $K_0$ of non-zero elements in $\tilde{W}_2$ based on the configured parameter combination, and determine the non-zero elements in $\tilde{W}_2$ based on the maximum quantity $K_0$. The terminal device indicates the non-zero elements in $\tilde{W}_2$ to the network device. In this way, the network device can obtain the matrix $\tilde{W}_2$.

The network device may further indicate a value of $M_v$ to the terminal device. The terminal device may select the $M_v$ columns from the DFT matrix set, and notify the network device of which columns the selected $M_v$ columns are, so that the network device can obtain the matrix $W_f$.

The network device may determine the precoding matrix W, encode the downlink data by using the precoding matrix W, and send encoded downlink data to the terminal device.

This application focuses on the matrix $\tilde{W}_2$, and the matrix $W_1$ and the matrix $W_f$ are not described in detail again.

In a possible implementation, a set of values to which $K_1$ can be set is $K_1=\{2,4,8,12,16,24,32\}$, a set of values to which $M_v$ can be set is $M_v=\{1,2\}$, and a set of values to which β can be set is $\{\frac{1}{4}, \frac{1}{2}, \frac{3}{4}, 1\}$. In cases of these value sets, there are 7*2*4=56 possible parameter combination cases of a ternary parameter combination (β, $K_1$, $M_v$), which is far beyond the eight parameter combination cases specified in R16. Therefore, overheads of configuring the parameter combination to the terminal device by the network device are large.

Based on this, this application proposes that a parameter α is introduced, and the ternary parameter combination (β, $K_1$, $M_v$) is changed to a ternary parameter combination (β, α, $M_v$) to reduce possible parameter combination cases. The value of $K_1$ may be determined based on a, and a may be referred to as a port selection coefficient. For example, a quantity of parameter combination cases are reduced to 8. When the network device configures, to the terminal device, the parameter combination corresponding to the maximum quantity $K_0=\lceil \beta K_1 M_v \rceil$ of non-zero elements in the matrix $\tilde{W}_2$, configuration overheads can be reduced. For example, at least six bits are needed for indicating 56 parameter combinations, and only three bits are needed for indicating eight parameter combinations, so that three bits are saved.

The following describes the solution in detail with reference to the accompanying drawings. Features or content denoted by dashed lines in the accompanying drawings may be understood as optional operations or optional structures in embodiments of this application.

Figure 3:
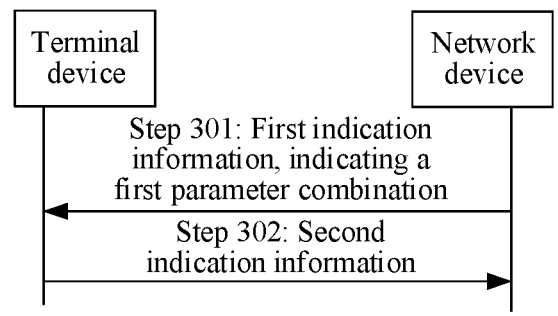
FIG. 3 is a schematic diagram of a communication process according to an embodiment of this application.

FIG. 3 shows a communication method, including at least the following steps.

Step 301: A network device sends first indication information to a terminal device, where the first indication information indicates a first parameter combination. Correspondingly, the terminal device receives the first indication information from the network device.

The network device prestores a plurality of parameter combinations, and the network device selects one parameter combination from the plurality of parameter combinations, and indicates the parameter combination to the terminal device by using the first indication information. To distinguish between the plurality of parameter combinations stored in the network device and the parameter combination indicated to the terminal device, the parameter combination indicated by the network device to the terminal device is referred to as the first parameter combination, and the first parameter combination is one of the plurality of parameter combinations.

When the network device indicates the first parameter combination to the terminal device, the first indication information may include an index (which may also be referred to as a number) of the first parameter combination. The terminal device prestores a plurality of parameter combinations and corresponding indexes, and the parameter combinations and corresponding indexes stored in the terminal device and the network device are the same. After receiving the index sent by the network device, the terminal device may find the corresponding first parameter combination based on the index.

When the network device indicates the first parameter combination to the terminal device, the first indication information may include indexes of values of some/all parameters in the first parameter combination, or the first indication information includes values of some/all parameters in the first parameter combination.

The plurality of parameter combinations may be stored in a form of a table. For example, one parameter combination occupies one row in the table, or one parameter combination occupies one column in the table.

Any parameter combination includes at least two of the following: a value of $M_v$, a value of β, and a value of α. In this way, the first parameter combination also includes at least two of the following: a first value of $M_v$, a first value of β, and a first value of α.

The first value of $M_v$ is any value in a value set of $M_v$. In an optional example, the value set of $M_v$ includes two values. For example, the value set of $M_v$ is $M_v=\{1,2\}$.

The first value of β is any value in a value set of β. In an optional example, the value set of β includes four values. For example, the value set of β is β=\{0.25,0.5, 0.75,1\}. For another example, the value set of β is β=\{0.125, 0.375, 0.625,0.875\}. For another example, the value set of β is β=\{0.125,0.25,0.5,0.75\}.

The first value of α is any value in a value set of α. In an optional example, the value set of α includes four values. For example, the value set of α is α=\{0.25,0.5,0.75,1\}. For another example, the value set of α is α=\{0.125,0.375, 0.625,0.875\}.

The value of α is for determining a quantity of rows of a coefficient matrix, the value of $M_v$ is a quantity of columns of the coefficient matrix, and the value of β is a proportion of non-zero elements to all elements in the coefficient matrix. For ease of differentiation, the coefficient matrix indicated by the terminal device to the network device is referred to as a first coefficient matrix. In this way, the first value of α is for determining a quantity of rows of the first coefficient matrix, the first value of $M_v$ is a quantity of columns of the first coefficient matrix, and the first value of β is a proportion of non-zero elements to all elements in the first coefficient matrix. The coefficient matrix herein may be for determining a precoding matrix. For example, the precoding matrix is W described above, $W=W_1\tilde{W}_2W_f^H$, and the coefficient matrix is $\tilde{W}_2$. For content of the precoding matrix, refer to the foregoing descriptions. Details are not described herein again.

In an optional example, a quantity of the plurality of parameter combinations is less than or equal to 32, for example, 32, 24, 16, or 8. For example, a quantity of parameter combinations of a ternary parameter combination (β, α, $M_v$) that includes four values of β, four values of a, and two values of $M_v$ is 4*4*4=32. For example, the quantity of the plurality of parameter combinations is less than 24. In different parameter combinations, at least one parameter has different values.

In an optional example, in the plurality of parameter combinations, values of one or two of the three parameters $M_v$, β, and α are the same. If the terminal device and the network device have agreed on the value of the parameter, or a protocol specifies the value of the parameter, the network device may not need to indicate the value to the terminal device. For example, the value is 1 or 0.75. When the value of one of the three parameters $M_v$, β, and α is fixedly 1, the ternary parameter combination (β, α, $M_v$) can be considered as a binary parameter combination.

A smaller quantity of the plurality of parameter combinations indicates a smaller quantity of bits needed when the network device configures the first parameter combination to the terminal device. For example, at least six bits are needed for indicating 56 parameter combinations, and only five bits are needed for indicating 32 parameter combinations, so that one bit is saved.

Any parameter combination is for determining that the coefficient matrix includes at most $K_0$ non-zero elements, and $K_0$ is determined based on the value of $M_v$, the value of $\beta$, and the value of $\alpha$. In this way, the first parameter combination is for determining that the first coefficient matrix to be indicated by the terminal device includes a maximum of $K_0$ non-zero elements, and $K_0$ is determined based on the first value of $M_v$, the first value of $\beta$, and the first value of $\alpha$.

In a possible example, $K_0$ is determined based on the value of $M_v$, the value of $\beta$, and the value of $K_1$. For example, $K_0 = \lceil \beta K_1 M_v \rceil$, a value of $K_1$ is the quantity of rows of the coefficient matrix, and the value of $K_1$ is determined based on the value of $\alpha$. In this way, a first value of $K_1$ is the quantity of rows of the first coefficient matrix, and the first value of $K_1$ is determined based on the first value of $\alpha$.

In an optional example, the value of $K_1$ is determined based on the value of $\alpha$ and a value of P, and the value of P is a quantity of ports used by the network device to send a downlink reference signal. In this way, the first value of $K_1$ is determined based on the first value of $\alpha$ and a first value of P, and the first value of P is a first quantity of ports used by the network device to send the downlink reference signal.

A correspondence among the values of $\alpha$, P, and $K_1$ may be agreed on by the terminal device and the network device, or may be specified in a protocol. In this way, the terminal device and the network device may determine the respective values of $\alpha$, P, and $K_1$ based on the correspondence among the values. The value correspondence may be represented by using a formula, or may be represented by using a table.

In an optional example, when $\alpha*P-K_1 \leq 0$ is met, the first value of $K_1$ is a value of $K_1$ when a result of $\alpha*P-K_1$ is the largest, may be represented by $$\mathop{\mathrm{argmax}}_{K_1}\{\alpha*P - K_1 \geq 0\},$$

and is subsequently referred to as $K_1$ obtained based on $\max\{\alpha*P-K_1 \leq 0\}$. It may also be understood as that the first value of $K_1$ is a value of $K_1$ that is greater than or equal to $\alpha*P$ and for which an absolute value of a difference between $\alpha*P$ and $K_1$ is the smallest in a value set of $K_1$. The set of values to which $K_1$ can be set is $K_1=\{2,4,8,12,16,24,32\}$.

In an optional example, when $\alpha*P-K_1 \geq 0$ is met, the first value of $K_1$ is a value of $K_1$ when a result of $\alpha*P-K_1$ is the smallest, may be represented by $$\mathop{\mathrm{argmin}}_{K_1}\{\alpha*P - K_1 \geq 0\},$$

and is subsequently referred to as $K_1$ obtained based on $\min\{\alpha*P-K_1 \geq 0\}$. Alternatively, it may be understood as that the first value of $K_1$ is a value of $K_1$ that is less than or equal to $\alpha*P$ and for which an absolute value of a difference between $\alpha*P$ and $K_1$ is the smallest in a value set of $K_1$. The set of values to which $K_1$ can be set is $K_1=\{2,4,8,12,16,24,32\}$.

For example, when $\alpha=1$, and P=32, when $\alpha*P-K_1 \leq 0$ is met, a maximum value in a result of $\alpha*P-K_1$ is 0, and when $\alpha*P-K_1=0$, a value of $K_1$ is 32.

For example, when $\alpha=1$, and P=32, when $\alpha*P-K_1 \geq 0$ is met, a minimum value in a result of $\alpha*P-K_1$ is 0, and when $\alpha*P-K_1=0$, a value of $K_1$ is 32.

For example, when $\alpha=0.75$, and P=32, when $\alpha*P-K_1 \leq 0$ is met, a maximum value in a result of $\alpha*P-K_1$ is 0, and when $\alpha*P-K_1=0$, a value of $K_1$ is 24.

For example, when $\alpha=0.75$, and P=32, when $\alpha*P-K_1 \geq 0$ is met, a minimum value in a result of $\alpha*P-K_1$ is 0, and when $\alpha*P-K_1=0$, a value of $K_1$ is 24.

For example, when $\alpha=0.5$, and P=32, a value of $K_1$ obtained based on $\max\{\alpha*P-K_1 \leq 0\}$ is 16, and a value of $K_1$ obtained based on $\min\{\alpha*P-K_1 \geq 0\}$ is 16.

For example, when $\alpha=0.25$, and P=32, a value of $K_1$ obtained based on $\max\{\alpha*P-K_1 \leq 0\}$ is 8, and a value of $K_1$ obtained based on $\min\{\alpha*P-K_1 \geq 0\}$ is 8.

For example, when $\alpha=1$, and P=24, a value of $K_1$ obtained based on $\max\{\alpha*P-K_1 \leq 0\}$ is 24, and a value of $K_1$ obtained based on $\min\{\alpha*P-K_1 \geq 0\}$ is 24.

For example, when $\alpha=0.75$, and P=24, a value of $K_1$ obtained based on $\max\{\alpha*P-K_1 \leq 0\}$ is 24, and a value of $K_1$ obtained based on $\min\{\alpha*P-K_1 \geq 0\}$ is 16.

For example, when $\alpha=0.5$, and P=24, a value of $K_1$ obtained based on $\max\{\alpha*P-K_1 \leq 0\}$ is 12, and a value of $K_1$ obtained based on $\min\{\alpha*P-K_1 \geq 0\}$ is 12.

For example, when $\alpha=0.25$, and P=24, a value of $K_1$ obtained based on $\max\{\alpha*P-K_1 \leq 0\}$ is 8, and a value of $K_1$ obtained based on $\min\{\alpha*P-K_1 \geq 0\}$ is 4.

For example, when $\alpha=1$, and P=12, a value of $K_1$ obtained based on $\max\{\alpha*P-K_1 \leq 0\}$ is 12, and a value of $K_1$ obtained based on $\min\{\alpha*P-K_1 \geq 0\}$ is 12.

For example, when $\alpha=0.75$, and P=12, a value of $K_1$ obtained based on $\max\{\alpha*P-K_1 \leq 0\}$ is 12, and a value of $K_1$ obtained based on $\min\{\alpha*P-K_1 \geq 0\}$ is 8.

For example, when $\alpha=0.5$, and P=12, a value of $K_1$ obtained based on $\max\{\alpha*P-K_1 \leq 0\}$ is 8, and a value of $K_1$ obtained based on $\min\{\alpha*P-K_1 \geq 0\}$ is 4.

For example, when $\alpha=0.25$, and P=12, a value of $K_1$ obtained based on $\max\{\alpha*P-K_1 \leq 0\}$ is 4, and a value of $K_1$ obtained based on $\min\{\alpha*P-K_1 \geq 0\}$ is 2.

For example, when $\alpha=1$, and P=4, a value of $K_1$ obtained based on $\max\{\alpha*P-K_1 \leq 0\}$ is 4, and a value of $K_1$ obtained based on $\min\{\alpha*P-K_1 \geq 0\}$ is 4.

For example, when $\alpha=0.75$, and P=4, a value of $K_1$ obtained based on $\max\{\alpha*P-K_1 \leq 0\}$ is 4, and a value of $K_1$ obtained based on $\min\{\alpha*P-K_1 \geq 0\}$ is 2.

For example, when $\alpha=0.5$, and P=4, a value of $K_1$ obtained based on $\max\{\alpha*P-K_1 \leq 0\}$ is 2, and a value of $K_1$ obtained based on $\min\{\alpha*P-K_1 \geq 0\}$ is 2.

For example, when $\alpha=0.25$, and P=4, a value of $K_1$ obtained based on $\max\{\alpha*P-K_1 \leq 0\}$ is 2, and a value of $K_1$ obtained based on $\min\{\alpha*P-K_1 \geq 0\}$ is null (that is, there is no value that meets the condition).

In this determining manner, it can be ensured that the determined value of $K_1$ is still a value of $K_1$ in an existing value set (for example, $K_1=\{2,4,8,12,16,24,32\}$).

In an optional example, when the value of $\alpha$ is small, for example, when $\alpha=0.25$, a value of $K_1$ may be obtained based on $\max\{\alpha*P-K_1 \leq 0\}$. In this way, it can be ensured that the value of $K_1$ can be obtained when the value of P is small. For example, when P=4, based on $\max\{\alpha*P-K_1 \leq 0\}$, it may be determined that the value of $K_1$ is 2 from the set $K_1=\{2,4,8,12,16,24,32\}$.

In an optional example, when the value of $\alpha$ is large, for example, when $\alpha=0.5$, 0.75, or 1, a value of $K_1$ may be obtained based on $\min\{\alpha*P-K_1 \geq 0\}$. In this way, a probability that the same value of $K_1$ is obtained for different values of α can be reduced. For example, when P=12 or 24, for different values of α, values of $K_1$ obtained based on $\min\{\alpha*P-K_1 \geq 0\}$ are all different.

In an optional example, the first value of $K_1$ is $K_1=\lceil \alpha*P \rceil$, where ⌈ ⌉ represents rounding up. In this determining manner, a relationship between P and $K_1$ can be simplified, so that a process of determining $K_1$ is simpler.

In an optional example, with reference to $\max\{\alpha*P-K_1 \leq 0\}$ and $\min\{\alpha*P-K_1 \geq 0\}$, as shown in Table 1, a correspondence for determining the values of α, P, and $K_1$ is provided. In the following plurality of correspondences, some correspondences are determined based on $\max\{\alpha*P-K_1 \leq 0\}$, and some correspondences are determined based on $\min\{\alpha*P-K_1 \geq 0\}$.

TABLE 1

|  | P | α | $K_1$ |
|---|---|---|---|
| Configuration1 | 24 | 1 | 24 |
| Configuration2 | 24 | 0.75 | 16 |
| Configuration3 | 24 | 0.5 | 12 |
| Configuration4 | 24 | 0.25 | 8 |
| Configuration5 | 12 | 1 | 12 |
| Configuration6 | 12 | 0.75 | 8 |
| Configuration7 | 12 | 0.5 | 4 |
| Configuration8 | 12 | 0.25 | 4 |
| Configuration9 | 32 | 1 | 32 |
| Configuration10 | 32 | 0.75 | 24 |
| Configuration11 | 32 | 0.5 | 16 |
| Configuration12 | 32 | 0.25 | 8 |
| Configuration13 | 16 | 1 | 16 |
| Configuration14 | 16 | 0.75 | 12 |
| Configuration15 | 16 | 0.5 | 8 |
| Configuration16 | 16 | 0.25 | 4 |
| Configuration17 | 8 | 1 | 8 |
| Configuration18 | 8 | 0.75 | 4 |
| Configuration19 | 8 | 0.5 | 4 |
| Configuration20 | 8 | 0.25 | 4 |
| Configuration21 | 4 | 1 | 4 |
| Configuration22 | 4 | 0.75 | 2 |
| Configuration23 | 4 | 0.5 | 2 |
| Configuration24 | 4 | 0.25 | 2 |

It should be noted that Configuration1, Configuration2, . . . , Configuration8, . . . , and the like in the table in this application are merely examples of indexes, and are not intended to limit a sequence of parameter combinations.

In an optional example, as shown in Table 2, a correspondence for determining the values of α, P, and $K_1$ is provided.

TABLE 2

|  | P | α | $K_1$ |
|---|---|---|---|
| Configuration1 | 24 | 1 | 24 |
| Configuration2 | 24 | 0.75 | 18 |
| Configuration3 | 24 | 0.5 | 12 |
| Configuration4 | 24 | 0.25 | 6 |
| Configuration5 | 12 | 1 | 12 |
| Configuration6 | 12 | 0.75 | 9 |
| Configuration7 | 12 | 0.5 | 6 |
| Configuration8 | 12 | 0.25 | 3 |
| . . . | . . . | . . . | . . . |

Cases in which α={0.25,0.5,0.75,1} and P={4,8,16,32} are omitted in Table 2, and in these cases, the value of $K_1$ may be obtained according to a formula $K_1=\lceil \alpha*P \rceil$.

In an optional example, the first value (to be specific, the first quantity of ports used by the network device to send the downlink reference signal) of P is specified in a protocol. In this way, the network device does not need to indicate, to the terminal device, the first quantity of ports used by the network device to send the downlink reference signal.

In an optional example, the network device sends third indication information to the terminal device, where the third indication information indicates the first quantity (the first value of P) of ports used by the network device to send the downlink reference signal. Correspondingly, the terminal device receives the third indication information from the network device, where the third indication information indicates the first quantity of ports used by the network device to send the downlink reference signal. In this way, a proper quantity of ports can be selected with reference to different communication scenarios, to better meet a communication requirement.

The first value of P is any value in a value set of P. In an optional example, there are six values in the value set of P. For example, the value set of P is P={4,8,12,16,24,32}, and the first value of P is, for example, 4, 8, or 12.

Step 302: The terminal device sends second indication information to the network device, and correspondingly, the network device receives the second indication information from the terminal device.

The second indication information indicates $K_2$ non-zero elements in the first coefficient matrix, and $K_2$ is less than or equal to $K_0$.

The second indication information (that is, the $K_2$ non-zero elements in the first coefficient matrix) is determined based on the downlink reference signal from the network device. To be specific, the network device sends the downlink reference signal to the terminal device, and the terminal device needs to perform channel estimation based on the downlink reference signal, perform PMI calculation based on an estimated equivalent channel, to obtain a matrix, and then select $K_2$ non-zero elements from the matrix.

The first coefficient matrix is for determining a precoding matrix. For example, the precoding matrix is W described above, $W=W_1 \tilde{W}_2 W_f^H$, and the coefficient matrix is $\tilde{W}_2$. For content of the precoding matrix, refer to the foregoing descriptions. Details are not described herein again.

The following describes in detail the plurality of parameter combinations in this application.

When the value set of β is β={0.25,0.5,0.75,1}, the value set of $M_v$ is $M_v$={1,2}, and the value set of α is α={0.25, 0.5,0.75,1}, there are 32 parameter combinations in total for a ternary parameter combination including {α, β, $M_v$}.

When the value of $K_1$ is small, a maximum quantity (for example, $K_0=\lceil \beta K_1 M_v \rceil$) of non-zero elements that a terminal is allowed to report is small. Therefore, to remove a combination with a small quantity of non-zero elements, the value of $K_1$ may be large. For example, the value set of $K_1$ may include two or three large values.

For the ternary parameter combination (α, β, $M_v$), a small value of α or β causes a small maximum quantity of non-zero elements that are allowed to be reported by the terminal, and a small fluctuation interval of the maximum quantity of non-zero elements reported by the terminal (for example, in comparison with the value of α being 0.75, when the value of α is 0.25, the maximum quantity of non-zero elements fluctuates insignificantly when β is adjusted). In this case, reporting overheads of the terminal also fall within a low overhead range, and overall system performance is poor. The parameter combination with the small quantity of non-zero elements can be removed. To remove the parameter combination with the small quantity of non-zero elements, in an optional example, the value of α and/or β is large. For example, if α is not set to 0.25, and $\beta$ is not set to 0.25, the value sets of $\beta$, $\alpha$, and $M_v$ may have the following several possible configurations:

(1) The value set of $\beta$ is $\beta=\{0.5,0.75,1\}$, the value set of $\alpha$ is $\alpha=\{0.5,0.75,1\}$, and the value set of $M_v$ is $M_v=\{1, 2\}$.

(2) The value set of $\beta$ is $\beta=\{0.5,0.75,1\}$, the value set of $\alpha$ is $\alpha=\{0.75,1\}$, and the value set of $M_v$ is $M_v=\{1,2\}$.

(3) The value set of $\beta$ is $\beta=\{0.5,0.75,1\}$, the value set of $\alpha$ is $\alpha=\{0.5,1\}$, and the value set of $M_v$ is $M_v=\{1,2\}$.

(4) The value set of $\beta$ is $\beta=\{0.75,1\}$, the value set of $\alpha$ is $\alpha=\{0.5,0.75,1\}$, and the value set of $M_v$ is $M_v=\{1,2\}$.

(5) The value set of $\beta$ is $\beta=\{0.5,1\}$, the value set of $\alpha$ is $\alpha=\{0.5,0.75,1\}$, and the value set of $M_v$ is $M_v=\{1,2\}$.

In this application, a ternary parameter combination ($\alpha$, $\beta$, $M_v$) that is determined based on the ternary parameter combination ($\alpha$, $\beta$, $M_v$) and that has a small maximum quantity of non-zero elements is deleted, so that the system performance can be improved, and a total quantity of parameter combinations of the ternary parameter combination can be effectively reduced, to reduce overheads of indicating the first parameter combination by the network device to the terminal device.

When $\alpha$ is not introduced, the ternary parameter combination includes the parameters: $M_v$, $K_1$, and $\beta$. When $M_v=1$, a ternary parameter combination ($M_v$, $K_1$, $\beta$) is considered as a binary parameter combination ($K_1$, $\beta$). $\beta$ may be fixed, and $K_1$ may be adjusted; $K_1$ may be fixed, and $\beta$ may be adjusted; or $K_1$ and $\beta$ may be both adjusted, to select a maximum quantity $K_0$ of non-zero elements in the coefficient matrix. When a maximum quantity $K_0$ of non-zero elements obtained by fixing $K_1$ and adjusting $\beta$ is the same as a maximum quantity $K_0$ of non-zero elements obtained by fixing $\beta$ and adjusting $K_1$, a performance difference between the two is not large. The fixing $K_1$ and adjusting $\beta$ herein may be understood as that, when the value of $K_1$ is kept unchanged, $\beta$ is set to different values.

For example, in Table 3, $K_1$ is fixed, $\beta$ is adjusted, and $K_1=P$, so that there may be at least one of the following configurations:

TABLE 3

|  | $K_1$ | $\beta$ |
|---|---|---|
| Configuration1 | P | 1 |
| Configuration2 | P | 0.75 |
| Configuration3 | P | 0.5 |
| Configuration4 | P | 0.25 |

For example, in Table 4, when $\beta$ is fixed, $K_1$ is adjusted, and $\beta=1$, a port of $W_1$ may be selected by adjusting $K_1$, and there may be at least one of the following configurations:

TABLE 4

|  | $K_1$ | $\beta$ |
|---|---|---|
| Configuration1 | 32 | 1 |
| Configuration2 | 24 | 1 |
| Configuration3 | 16 | 1 |
| Configuration4 | 12 | 1 |
| Configuration5 | 8 | 1 |
| Configuration6 | 4 | 1 |
| Configuration7 | 2 | 1 |

However, for a binary parameter combination, one parameter is fixed (for example, the parameter is set to a large value), and the other parameter is adjusted, so that reporting overheads (where a larger quantity of reported non-zero elements indicates a larger reporting overhead) of UE can be distributed more evenly, so that the system performance is more evenly distributed as the parameter changes. In this application, when $\alpha$ is introduced, the same principle applies to a ternary parameter combination ($M_v$, $\alpha$, $\beta$).

In a plurality of parameter combinations of ($M_v$, $\alpha$, $\beta$) in this application, for a plurality of parameter combinations in which $M_v=1$, values of $\beta$ in at least two parameter combinations are the same, and the value is a maximum value in the value set of $\beta$, or values of $\alpha$ are the same, and the value is a maximum value in the values of $\alpha$. $\beta$ is used as an example. For example, when the value set of $\beta$ is $\beta=\{0.25, 0.5,0.75,1\}$, the values of $\beta$ in at least two parameter combinations are 1; and for example, when the value set of $\beta$ is $\beta=\{0.25,0.5,0.75\}$, and the maximum value is 0.75, the values of $\beta$ in at least two parameter combinations are 0.75.

In an optional example, in the plurality of parameter combinations, the plurality of parameter combinations in which $M_v=1$ include at least two parameter combinations in which the value of $\beta$ is 1 or the value of $\alpha$ is 1. In other words, the maximum value of $\beta$ in the value set of $\beta$ is 1, and the maximum value of $\alpha$ in the value set of $\alpha$ is 1.

When $\alpha$ is introduced, the ternary parameter combination ($M_v$, $\alpha$, $\beta$) is considered as a binary parameter combination ($\alpha$, $\beta$) when $M_v=1$. A proportion of non-zero elements may be selected by adjusting $\beta$, or the port (namely, $K_1$) of $W_1$ may be selected by adjusting $\alpha$. When maximum quantities $K_0$ of non-zero elements obtained by the two are the same, a performance difference between the two is not large. A value of one of the parameters is fixed (for example, the parameter is set to a large value), and a value of the other parameter is adjusted, so that the reporting overheads of the UE can be distributed more evenly. When the value of the parameter is fixed and the value is large, an overall fluctuation range of the reporting overhead distribution of the UE is large, so that the system performance changes more evenly with the adjustment of the parameter, and the overall performance fluctuates in a large range.

For example, in Table 5, when the parameter $\alpha=1$, the parameter $\beta$ may be adjusted, and there may be at least one of the following configurations:

TABLE 5

|  | $M_v$ | $\alpha$ | $\beta$ |
|---|---|---|---|
| Configuration1 | 1 | 1 | 1 |
| Configuration2 | 1 | 1 | 0.75 |
| Configuration3 | 1 | 1 | 0.5 |
| Configuration4 | 1 | 1 | 0.25 |

When $\beta$ is fixed, the port (namely, $K_1$) of $W_1$ may be adjusted by adjusting $\alpha$, for example, in Table 6. For example, when $\beta=1$, there may be at least one of the following configurations:

TABLE 6

|  | $M_v$ | $\alpha$ | $\beta$ |
|---|---|---|---|
| Configuration1 | 1 | 1 | 1 |
| Configuration2 | 1 | 0.75 | 1 |
| Configuration3 | 1 | 0.5 | 1 |
| Configuration4 | 1 | 0.25 | 1 |

In consideration of a case in which $\beta$ or $\alpha$ is small, a small quantity of non-zero elements are selected. Especially, when a quantity of ports is small, a smaller quantity of non-zero elements are selected. Therefore, in the plurality of parameter combinations, a minimum value in the value set of β or α may not be considered.

For example, in Table 7, α=1, so that there may be at least one of the following configurations:

TABLE 7

|  | $M_v$ | α | β |
|---|---|---|---|
| Configuration1 | 1 | 1 | 1 |
| Configuration2 | 1 | 1 | 0.75 |
| Configuration3 | 1 | 1 | 0.5 |

For example, in Table 8, when β=1, there may be at least one of the following configurations:

TABLE 8

|  | $M_v$ | α | β |
|---|---|---|---|
| Configuration1 | 1 | 1 | 1 |
| Configuration2 | 1 | 0.75 | 1 |
| Configuration3 | 1 | 0.5 | 1 |

When $M_v$=1, and $K_1$=1, a single CSI-RS port corresponds to a maximum of one non-zero element. To achieve an objective of a plurality of non-zero elements, a plurality of CSI-RS ports may be used, and the plurality of CSI-RS ports may correspond to a maximum of the plurality of non-zero elements. The plurality of CSI-RS ports correspond to a plurality of CSI-RSs, and overheads of sending the plurality of CSI-RSs are large. When $K_1$=1 is not changed, and $M_v$=2, a single CSI-RS port corresponds to a maximum of two non-zero elements, and one CSI-RS port may also be used to achieve the objective of the plurality of non-zero elements, which may help reduce the CSI-RS overheads.

However, the plurality of non-zero elements refers to high reporting overheads of the terminal, especially when there are a large quantity of ports, the reporting overheads are higher. Therefore, when there are the large quantity of CSI-RS ports, a quantity of selected ports (for example, α is referred to as a port selection coefficient) may be controlled based on α. The value of α cannot be excessively large (where a large value of α indicates a large quantity of non-zero elements), and an excessively large value cannot be used to achieve an objective of reducing the reporting overheads of the terminal. The value of α cannot be excessively small either. If the value of α is excessively small, a fluctuation interval of a quantity of non-zero elements reported by the terminal is small (for example, in comparison with the value of α being 0.75, when the value of α is 0.25, the quantity of non-zero elements fluctuates insignificantly when β is adjusted). In this case, the reporting overheads of the terminal also fall within a low overhead range, and the overall system performance is not considered. Therefore, the selection of α should effectively balance the system performance and the reporting overheads of the UE.

In an optional example, when P is less than or equal to 16, $M_v$=2, α={0.5,0.75,1}, and β={0.25,0.5,0.75,1}. When P is greater than 16, $M_v$=2, α={0.5,0.25}, and β={0.25,0.5,0.75,1}. When the quantity of CSI-RS ports is small, the value of α is large; and when the quantity of CSI-RS ports is large, the value of α is small, to effectively balance the system performance and the reporting overheads of the UE.

In an optional example, for example, in Table 9, there may be at least one of the following configurations: When P is less than or equal to 16, $M_v$=2, α=1, β={0.25,0.5,0.75,1}, and the value of β may be adjusted; when P is greater than 16, $M_v$=2, α=0.5, β={0.25,0.5,0.75,1}, and the value of β may be adjusted; and when P is less than 32, $M_v$=2, α=0.75, β={0.25,0.5,0.75,1}, and the value of β may be adjusted.

TABLE 9

|  | $M_v$ | α | β | Constraints (optional) |
|---|---|---|---|---|
| Configuration1 | 2 | 1 | 1 | Optionally, |
| Configuration2 | 2 | 1 | 0.75 | P ≤ 16 |
| Configuration3 | 2 | 1 | 0.5 |  |
| Configuration4 | 2 | 1 | 0.25 |  |
| Configuration5 | 2 | 0.5 | 1 | Optionally, |
| Configuration6 | 2 | 0.5 | 0.75 | P > 16 |
| Configuration7 | 2 | 0.5 | 0.5 |  |
| Configuration8 | 2 | 0.5 | 0.25 |  |
| Configuration9 | 2 | 0.75 | 1 | Optionally, |
| Configuration10 | 2 | 0.75 | 0.75 | P < 32 |
| Configuration11 | 2 | 0.75 | 0.5 |  |
| Configuration12 | 2 | 0.75 | 0.25 |  |

In an optional example, when the value of β is small, the quantity of non-zero elements may be small, the fluctuation interval of the quantity of non-zero elements is small, and the overall system performance is poor. Therefore, β={0.5, 0.75,1} in the ternary parameter combination of β, α, and $M_v$ may be considered to improve the system performance, help further reduce the quantity of parameter combinations, and reduce the overheads of indicating the first parameter combination by the network device to the terminal device.

In this case, as shown in Table 10, there may be at least one of the following configurations: When P is less than or equal to 16, $M_v$=2, α=1, β={0.5,0.75,1}, and the value of β may be adjusted; when P is greater than 16, $M_v$=2, α=0.5, β={0.5,0.75,1}, and the value of β may be adjusted; and when P is less than 32, $M_v$=2, α=0.75, β={0.5,0.75,1}, and the value of β may be adjusted.

TABLE 10

|  | $M_v$ | α | β | Constraints (optional) |
|---|---|---|---|---|
| Configuration1 | 2 | 1 | 1 | Optionally, |
| Configuration2 | 2 | 1 | 0.75 | P ≤ 16 |
| Configuration3 | 2 | 1 | 0.5 |  |
| Configuration4 | 2 | 0.5 | 1 | Optionally, |
| Configuration5 | 2 | 0.5 | 0.75 | P > 16 |
| Configuration6 | 2 | 0.5 | 0.5 |  |
| Configuration7 | 2 | 0.75 | 1 | Optionally, |
| Configuration8 | 2 | 0.75 | 0.75 | P < 32 |
| Configuration9 | 2 | 0.75 | 0.5 |  |

In addition, a non-zero element location (Bitmap) is related to $K_1$ and $M_v$, and adjusting the value of α may affect the value of $K_1$, so that indication overheads of the non-zero element location (Bitmap) are affected by adjusting α. Therefore, β may be fixed to adjust α, to achieve an objective of reducing the reporting overheads of the UE. When there are a large quantity of CSI-RS ports, β is fixedly a small value, and the reporting overheads of the UE are reduced by adjusting α.

In an optional example, when P is less than or equal to 16, $M_v$=2, α={0.25,0.5,0.75,1}, and β={0.5,0.75,1}. When P is greater than 16, $M_v$=2, α={0.25,0.5,0.75,1}, and β={0.5, 0.25}. When the quantity of CSI-RS ports is small, the value of α is large; and when the quantity of CSI-RS ports is large, the value of α is small, to effectively balance the system performance and the reporting overheads of the UE.

In an optional example, for example, in Table 11, there may be at least one of the following configurations: When P is less than or equal to 16, $M_v=2$, $\beta=1$, $\alpha=\{0.25,0.5,0.75,1\}$, and the value of $\alpha$ may be adjusted; when P is greater than 16, $M_v=2$, $\beta=0.5$, $\alpha=\{0.25,0.5,0.75,1\}$, and the value of $\alpha$ may be adjusted; and when P is less than 32, $M_v=2$, $\beta=0.75$, $\alpha=\{0.25,0.5,0.75,1\}$, and the value of $\alpha$ may be adjusted.

TABLE 11

| | $M_v$ | $\alpha$ | $\beta$ | Constraints (optional) |
|---|---|---|---|---|
| Configuration1 | 2 | 1 | 1 | Optionally, |
| Configuration2 | 2 | 0.75 | 1 | P ≤ 16 |
| Configuration3 | 2 | 0.5 | 1 | |
| Configuration4 | 2 | 0.25 | 1 | |
| Configuration5 | 2 | 1 | 0.5 | Optionally, |
| Configuration6 | 2 | 0.75 | 0.5 | P > 16 |
| Configuration7 | 2 | 0.5 | 0.5 | |
| Configuration8 | 2 | 0.25 | 0.5 | |
| Configuration9 | 2 | 1 | 0.75 | Optionally, |
| Configuration10 | 2 | 0.75 | 0.75 | P ≤ 32 |
| Configuration11 | 2 | 0.5 | 0.75 | |
| Configuration12 | 2 | 0.25 | 0.75 | |

In an optional example, when the value of $\alpha$ is small, the maximum quantity of non-zero elements may be small, a fluctuation interval of the maximum quantity of non-zero elements is small, and the overall system performance is poor. Therefore, $\alpha=\{0.5,0.75,1\}$ in the ternary parameter combination of $\beta$, $\alpha$, and $M_v$ may be considered to improve the system performance, further help further reduce the quantity of parameter combinations, and reduce the overheads of indicating the first parameter combination by the network device to the terminal device.

In this case, as shown in Table 12, there may be at least one of the following configurations: When P is less than or equal to 16, $M_v=2$, $\beta=1$, $\alpha=\{0.5,0.75,1\}$, and the value of $\alpha$ may be adjusted; when P is greater than 16, $M_v=2$, $\beta=0.5$, $\alpha=\{0.5,0.75,1\}$, and the value of $\alpha$ may be adjusted; and when P is less than 32, $M_v=2$, $\beta=0.75$, $\alpha=\{0.5,0.75,1\}$, and the value of $\alpha$ may be adjusted.

TABLE 12

| | $M_v$ | $\alpha$ | $\beta$ | Constraints (optional) |
|---|---|---|---|---|
| Configuration1 | 2 | 1 | 1 | Optionally, |
| Configuration2 | 2 | 0.75 | 1 | P ≤ 16 |
| Configuration3 | 2 | 0.5 | 1 | |
| Configuration4 | 2 | 1 | 0.5 | Optionally, |
| Configuration5 | 2 | 0.75 | 0.5 | P > 16 |
| Configuration6 | 2 | 0.5 | 0.5 | |
| Configuration7 | 2 | 1 | 0.75 | Optionally, |
| Configuration8 | 2 | 0.75 | 0.75 | P ≤ 32 |
| Configuration9 | 2 | 0.5 | 0.75 | |

To control the reporting overheads of the terminal, a maximum quantity of non-zero elements fed back in cases of different ranks may be limited. The plurality of parameter combinations in this application are associated with values of at least two ranks. For example, the plurality of parameter combinations are associated with values of two, three, or four ranks. For another example, the plurality of parameter combinations are associated with values of two types of ranks. The rank less than 2 is one type, and the rank greater than 2 is another type. To be specific, when the rank is less than 2, there is a corresponding parameter combination; and when the rank is greater than 2, there is a corresponding parameter combination. The parameter combinations for the two types of ranks are different. Usually, for a case in which rank>2, one $W_2$ is fed back at each layer.

To control reporting overheads of the terminal of a high rank, a value of $\beta$ in the parameter combination when a rank is greater than 2 is less than or equal to a value of $\beta$ in the parameter combination when a rank is less than or equal to 2.

In an example, the five possible parameter combinations described above are as follows:

(1) The value set of $\beta$ is $\beta=\{0.5,0.75,1\}$, the value set of $\alpha$ is $\alpha=\{0.5,0.75,1\}$, and the value set of $M_v$ is $M_v=\{1,2\}$.

(2) The value set of $\beta$ is $\beta=\{0.5,0.75,1\}$, the value set of $\alpha$ is $\alpha=\{0.75,1\}$, and the value set of $M_v$ is $M_v=\{1,2\}$.

(3) The value set of $\beta$ is $\beta=\{0.5,0.75,1\}$, the value set of $\alpha$ is $\alpha=\{0.5,1\}$, and the value set of $M_v$ is $M_v=\{1,2\}$.

(4) The value set of $\beta$ is $\beta=\{0.75,1\}$, the value set of $\alpha$ is $\alpha=\{0.5,0.75,1\}$, and the value set of $M_v$ is $M_v=\{1,2\}$.

(5) The value set of $\beta$ is $\beta=\{0.5,1\}$, the value set of $\alpha$ is $\alpha=\{0.5,0.75,1\}$, and the value set of $M_v$ is $M_v=\{1,2\}$.

The five possible parameter combinations are applicable when ranks are 1 to 4, or are applicable only when the rank is low, and are not applicable when the rank is high. In an example, the low rank means that rank=1 or rank=2, and the high rank means that the rank is greater than 2. In an example, the low rank means that rank=1, and the high rank means that the rank is greater than 1. In an example, the low rank means that the rank is less than 3, and the high rank means that the rank is greater than 3.

To control the reporting overheads of the terminal, the maximum quantity of non-zero elements fed back in cases of different ranks may be limited. To ensure that a quantity of non-zero elements corresponding to the high rank does not exceed a quantity of non-zero elements corresponding to the low rank, an optional example is that a value of a proportion $\beta$ of non-zero elements corresponding to the high rank does not exceed a value of a proportion $\beta$ of non-zero elements corresponding to the low rank. In other words, the value of $\beta$ in a parameter combination in a case of the high rank is less than or equal to the value of $\beta$ in a parameter combination in a case of the low rank.

For ease of description below, the proportion $\beta$ of non-zero elements corresponding to the high rank is referred to as $\beta1$, and the proportion $\beta$ of non-zero elements corresponding to the low rank is referred to as $\beta2$.

In an optional example, when values of $M_v$ and $\alpha$ are the same, $\beta1$ ($\beta$ in the high rank)<$\beta2$ ($\beta$ in the low rank), and there may be at least one of the following configurations:

$M_v=\{1,2\}$, $\alpha=\{0.5,0.75,1\}$, $\beta2=\{0.25,0.5,0.75,1\}$, and $\beta1=\{0.125,0.375,0.625,0.875\}$;

$M_v=\{1,2\}$, $\alpha=\{0.5,0.75,1\}$, $\beta2=\{0.25,0.5,0.75,1\}$, and $\beta1=\{0.125,0.25,0.375,0.5\}$;

$M_v=\{1,2\}$, $\alpha=\{0.5,0.75,1\}$, $\beta2=\{0.25,0.5,0.75,1\}$, and $\beta1=\{0.125,0.25,0.5,0.75\}$;

$M_v=\{1,2\}$, $\alpha=\{0.5,1\}$, $\beta2=\{0.25,0.5,0.75,1\}$, and $\beta1=\{0.125,0.375,0.625,0.875\}$;

$M_v=\{1,2\}$, $\alpha=\{0.5,1\}$, $\beta2=\{0.25,0.5,0.75,1\}$, and $\beta1=\{0.125,0.25,0.375,0.5\}$;

$M_v=\{1,2\}$, $\alpha=\{0.5,1\}$, $\beta2=\{0.25,0.5,0.75,1\}$, and $\beta1=\{0.125,0.25,0.5,0.75\}$;

$M_v=\{1,2\}$, $\alpha=\{0.75,1\}$, $\beta2=\{0.25,0.5,0.75,1\}$, and $\beta1=\{0.125,0.375,0.625,0.875\}$;

$M_v=\{1,2\}$, $\alpha=\{0.75,1\}$, $\beta2=\{0.25,0.5,0.75,1\}$, and $\beta1=\{0.125,0.25,0.375,0.5\}$; or $M_v=\{1,2\}$, $\alpha=\{0.75,1\}$, $\beta2=\{0.25,0.5,0.75,1\}$, and $\beta1=\{0.125,0.25,0.5,0.75\}$.

In addition, optionally, in any one of the foregoing configurations, a value of $\beta 1$ is in one-to-one correspondence with a value of $\beta 2$ in sequence. For example, when $\beta 2$ ($\beta$ in the low rank)=$\{0.25, 0.5, 0.75, 1\}$ and $\beta 1$ ($\beta$ in the high rank)=$\{0.125, 0.375, 0.625, 0.875\}$, if $\beta 2=0.25$, $\beta 1=0.125$; or if $\beta 2=1$, $\beta 1=0.875$. Other configurations are similar and are not described herein. The configuration information may be stored in a form of a table. For example, the parameter combination corresponding to the low rank and the parameter combination corresponding to the high rank may be combined in one or more tables.

In an optional example, when values $M_\nu$ of $\alpha$ and are the same, $\beta 2$ ($\beta$ in the low rank)=$\beta 1$ ($\beta$ in the high rank), and there may be at least one of the following configurations:

$M_\nu=\{1,2\}$, $\alpha=\{0.5, 0.75, 1\}$, $\beta 2=\{0.25, 0.5, 0.75, 1\}$, and $\beta 1=\{0.25, 0.5, 0.75, 1\}$;

$M_\nu=\{1,2\}$, $\alpha=\{0.5, 1\}$, $\beta 2=\{0.25, 0.5, 0.75, 1\}$, and $\beta 1=\{0.25, 0.5, 0.75, 1\}$; or $M_\nu=\{1,2\}$, $\alpha=\{0.75, 1\}$, $\beta 2=\{0.25, 0.5, 0.75, 1\}$, and $\beta 1=\{0.25, 0.5, 0.75, 1\}$.

In addition, optionally, in any one of the foregoing configurations, a value of $\beta 1$ is in one-to-one correspondence with a value of $\beta 2$ in a sequence. For example, when $\beta 2$ ($\beta$ in the low rank)=$\{0.25, 0.5, 0.75, 1\}$ and $\beta 1$ ($\beta$ in the high rank)=$\{0.25, 0.5, 0.75, 1\}$, if $\beta 2=0.25$, $\beta 1=0.25$; or if $\beta 2=1$, $\beta 1=1$. Other configurations are similar and are not described herein. The configuration information may be stored in the form of the table. For example, the parameter combination corresponding to the low rank and the parameter combination corresponding to the high rank may be combined in one or more tables.

It is considered that the maximum quantity of non-zero elements is small when the value of $\beta 1$ ($\beta$ in the high rank) and the value of $\beta 2$ ($\beta$ in the low rank) are small. For example, $\beta 1 \neq 0.125$ and $\beta 2 \neq 0.25$ may be made. For example, there may be at least one of the following configurations:

$M_\nu=\{1,2\}$, $\alpha=\{0.5, 0.75, 1\}$, $\beta 2=\{0.5, 0.75, 1\}$, and $\beta 1=\{0.375, 0.625, 0.875\}$;

$M_\nu=\{1,2\}$, $\alpha=\{0.5, 0.75, 1\}$, $\beta 2=\{0.5, 0.75, 1\}$, and $\beta 1=\{0.25, 0.375, 0.5\}$;

$M_\nu=\{1,2\}$, $\alpha=\{0.5, 0.75, 1\}$, $\beta 2=\{0.5, 0.75, 1\}$, and $\beta 1=\{0.25, 0.5, 0.75\}$;

$M_\nu=\{1,2\}$, $\alpha=\{0.5, 1\}$, $\beta 2=\{0.5, 0.75, 1\}$, and $\beta 1=\{0.375, 0.625, 0.875\}$;

$M_\nu=\{1,2\}$, $\alpha=\{0.5, 1\}$, $\beta 2=\{0.5, 0.75, 1\}$, and $\beta 1=\{0.25, 0.375, 0.5\}$;

$M_\nu=\{1,2\}$, $\alpha=\{0.5, 1\}$, $\beta 2=\{0.5, 0.75, 1\}$, and $\beta 1=\{0.25, 0.5, 0.75\}$;

$M_\nu=\{1,2\}$, $\alpha=\{0.75, 1\}$, $\beta 2=\{0.5, 0.75, 1\}$, and $\beta 1=\{0.375, 0.625, 0.875\}$;

$M_\nu=\{1,2\}$, $\alpha=\{0.75, 1\}$, $\beta 2=\{0.5, 0.75, 1\}$, and $\beta 1=\{0.25, 0.375, 0.5\}$;

$M_\nu=\{1,2\}$, $\alpha=\{0.75, 1\}$, $\beta 2=\{0.5, 0.75, 1\}$, and $\beta 1=\{0.25, 0.5, 0.75\}$;

$M_\nu=\{1,2\}$, $\alpha=\{0.5, 0.75, 1\}$, $\beta 2=\{0.5, 0.75, 1\}$, and $\beta 1=\{0.5, 0.75, 1\}$;

$M_\nu=\{1,2\}$, $\alpha=\{0.5, 1\}$, $\beta 2=\{0.5, 0.75, 1\}$, and $\beta 1=\{0.5, 0.75, 1\}$; or $M_\nu=\{1,2\}$, $\alpha=\{0.75, 1\}$, $\beta 2=\{0.5, 0.75, 1\}$, and $\beta 1=\{0.5, 0.75, 1\}$.

In addition, optionally, in the foregoing configuration, a value of $\beta 1$ is in one-to-one correspondence with a value of $\beta 2$ in sequence. For example, when $\beta 2$ ($\beta$ in the low rank)=$\{0.5, 0.75, 1\}$ and $\beta 1$ ($\beta$ in the high rank)=$\{0.375, 0.625, 0.875\}$, if $\beta 2=0.5$, $\beta 1=0.375$. Other configurations are similar and are not described herein. The configuration information may be stored in the form of the table.

In addition, the reporting overheads of the terminal in the case of the high rank may be controlled based on small $\alpha$. For example, in the case of the low rank, $\alpha=\{0.5, 0.75, 1\}$; and in the case of the high rank, $\alpha=\{0.375, 0.625, 0.875\}$.

To control the reporting overheads of the terminal, the maximum quantity of non-zero elements fed back in cases of different ranks may be limited. To ensure that the quantity of non-zero elements corresponding to the high rank does not exceed the quantity of non-zero elements corresponding to the low rank, another optional example is that the value of the proportion $\alpha$ of non-zero elements corresponding to the high rank does not exceed the value of the proportion $\alpha$ of non-zero elements corresponding to the low rank. In other words, the value of $\alpha$ in the parameter combination in the case of the high rank is less than or equal to the value of $\alpha$ in the parameter combination in the case of the low rank.

For ease of description below, a corresponding to the high rank is referred to as $\alpha 1$, and a corresponding to the low rank is referred to as $\alpha 2$. When values of $M_\nu$ and $\beta$ are the same, $\alpha 1$ ($\alpha$ in the high rank)<$\alpha 2$ ($\alpha$ in the low rank). For example, there may be at least one of the following configurations:

$M_\nu=\{1,2\}$, $\beta=\{0.25, 0.5, 0.75, 1\}$, $\alpha 2=\{0.5, 0.75, 1\}$, and $\alpha 1=\{0.375, 0.625, 0.875\}$;

$M_\nu=\{1,2\}$, $\beta=\{0.5, 0.75, 1\}$, $\alpha 2=\{0.5, 0.75, 1\}$, and $\alpha 1=\{0.375, 0.625, 0.875\}$;

$M_\nu=\{1,2\}$, $\beta=\{0.25, 0.5, 0.75, 1\}$, $\alpha 2=\{0.5, 0.75, 1\}$, and $\alpha 1=\{0.25, 0.375, 0.5\}$; or $M_\nu=\{1,2\}$, $\beta=\{0.5, 0.75, 1\}$, $\alpha 2=\{0.5, 0.75, 1\}$, and $\alpha 1=\{0.25, 0.375, 0.5\}$.

In addition, optionally, in the foregoing configuration, a value of $\alpha 1$ ($\alpha$ in the high rank) is in one-to-one correspondence with a value of $\alpha 2$ ($\alpha$ in the low rank) in sequence. For example, when $\alpha 2=\{0.5, 0.75, 1\}$ and $\alpha 1=\{0.375, 0.625, 0.875\}$, if $\alpha 2=0.5$, $\alpha 1=0.375$. Other configurations are similar and are not described herein. The configuration information may be stored in the form of the table.

In the foregoing example, the feedback overheads of the terminal of the high rank are controlled to be consistent with or not much different from the feedback overheads of the terminal of the low rank. This may be implemented based on different values of $\beta$ or $\alpha$. Usually, the high rank corresponds to a small value of $\beta$ or $\alpha$, and the low rank corresponds to a large value of $\beta$ or $\alpha$.

Optionally, the foregoing describes the plurality of parameter combinations about $M_\nu$, $\alpha$, and $\beta$ in different cases of the high rank and the low rank. The plurality of parameter combinations may not distinguish between the high rank and the low rank, and are applicable to all ranks. In a case in which the high rank and the low rank are not distinguished between, the parameter combinations of $\beta 1$ and $\beta 2$ described above may exist independently, and the parameter combinations of $\beta 1$ and $\beta 2$ do not need to be bound together. Similarly, the parameter combinations of $\alpha 1$ and $\alpha 2$ described above may exist independently, and the parameter combinations of $\alpha 1$ and $\alpha 2$ do not need to be bound together.

In a plurality of ternary parameter combinations ($\beta$, $\alpha$, $M_\nu$), there may be parameter combinations with similar reporting overheads of the terminal, but there are differences in performance or in a maximum quantity of non-zero elements. For the values of $\beta=\{0.25, 0.5, 0.75, 1\}$, $\alpha=\{0.5, 1\}$, and $M_\nu=\{1, 2\}$, the ternary parameter combination includes 16 parameter combination cases. For $M_\nu=1$, a maximum quantity of non-zero elements is $\beta K_1$. If the value of $\alpha$ is small, $K_1$ is small, and a value of the maximum quantity of non-zero elements is small. In this case, adjustment $\beta$ causes a small fluctuation of the value of the maximum quantity of non-zero elements. For $M_\nu=2$, if the value of $\alpha$ is small, bitmap overheads are reduced, especially for the high rank. Therefore, for combinations {$M_v$=2, α=1, β=0.5} and {$M_v$=2, α=0.5, β=1}, when the rank is high, the latter may use saved bitmap overheads for quantization of the non-zero element. In this way, more non-zero elements can be used for the high rank, to improve the system performance. In addition, it is considered that overheads of some parameter combinations may far exceed maximum reporting overheads of R16, so that the following shows a plurality of possible parameter combinations that are selected based on this:

$M_v$=1, α=1, and β=1;
$M_v$=1, α=1, and β=0.75;
$M_v$=1, α=1, and β=0.5;
$M_v$=1, α=0.5, and β=0.75;
$M_v$=1, α=0.5, and β=0.5;
$M_v$=1, α=0.5, and β=0.25;
$M_v$=2, α=1, and β=0.75; and
$M_v$=2, α=1, and β=0.5.

These possible parameter combinations are applicable to all ranks. Alternatively, these possible parameter combinations are applicable only when the rank is low (for example, rank=1 or rank=2).

As shown in Table 13, the eight parameter combinations may be stored in the form of the table.

TABLE 13

|  | $M_v$ | α | β |
|---|---|---|---|
| Configuration1 | 1 | 1 | 1 |
| Configuration2 | 1 | 1 | 0.75 |
| Configuration3 | 1 | 1 | 0.5 |
| Configuration4 | 1 | 0.5 | 0.75 |
| Configuration5 | 1 | 0.5 | 0.5 |
| Configuration6 | 1 | 0.5 | 0.25 |
| Configuration7 | 2 | 1 | 0.75 |
| Configuration8 | 2 | 1 | 0.5 |

In consideration of reducing load overheads of the high rank, when the rank (for example, rank<2) is low, β2={0.25, 0.5,0.75,1}; and when the rank (for example, rank>2) is high, the high rank corresponds to a small non-zero element proportion β1={0.125,0.375,0.625,0.875}. Based on this, a plurality of possible parameter combinations are selected, and the plurality of parameter combinations are applicable when the rank (for example, rank>2) is high.

$M_v$=1, α=1, and β1=0.875;
$M_v$=1, α=1, and β1=0.625;
$M_v$=1, α=1, and β1=0.375;
$M_v$=1, α=0.5, and β1=0.625;
$M_v$=1, α=0.5, and β1=0.375;
$M_v$=1, α=0.5, and β1=0.125;
$M_v$=2, α=1, and β1=0.625;
$M_v$=2, α=1, and β1=0.375;
$M_v$=1, α=1, and β1=0.5;
$M_v$=1, α=1, and β1=0.25;
$M_v$=1, α=0.5, and β1=0.25;
$M_v$=2, α=1, and β1=0.25;
$M_v$=1, α=1, and β1=0.75; or
$M_v$=1, α=0.5, and β1=0.5.

In an optional example, eight possible parameter combinations are selected as follows:

$M_v$=1, α=1, and β1=0.875;
$M_v$=1, α=1, and β1=0.625;
$M_v$=1, α=1, and β1=0.375;
$M_v$=1, α=0.5, and β1=0.625;
$M_v$=1, α=0.5, and β1=0.375;
$M_v$=1, α=0.5, and β1=0.125;
$M_v$=2, α=1, and β1=0.625; and
$M_v$=2, α=1, and β1=0.375.

Similarly, the eight parameter combinations may be stored in the form of the table.

Further, if the parameter combination in Table 13 is applicable only when rank<2 (where β in Table 13 may be referred to as β2), and the foregoing eight parameter combinations about β1 are applicable when rank>2, as shown in Table 14, the eight parameter combinations about β1 and the eight parameter combinations corresponding to Table 13 may be stored in one table. For example, there may be at least one of the following configurations:

TABLE 14

|  | $M_v$ | α | Rank < 2 β2 | Rank > 2 β1 |
|---|---|---|---|---|
| Configuration1 | 1 | 1 | 1 | 0.875 |
| Configuration2 | 1 | 1 | 0.75 | 0.625 |
| Configuration3 | 1 | 1 | 0.5 | 0.375 |
| Configuration4 | 1 | 0.5 | 0.75 | 0.625 |
| Configuration5 | 1 | 0.5 | 0.5 | 0.375 |
| Configuration6 | 1 | 0.5 | 0.25 | 0.125 |
| Configuration7 | 2 | 1 | 0.75 | 0.625 |
| Configuration8 | 2 | 1 | 0.5 | 0.375 |

In an optional example, eight possible parameter combinations are selected as follows:

$M_v$=1, α=1, and β1=0.5;
$M_v$=1, α=1, and β1=0.375;
$M_v$=1, α=1, and β1=0.25;
$M_v$=1, α=0.5, and β1=0.375;
$M_v$=1, α=0.5, and β1=0.25;
$M_v$=1, α=0.5, and β1=0.125;
$M_v$=2, α=1, and β1=0.375; and
$M_v$=2, α=1, and β1=0.25.

Similarly, the eight parameter combinations may be stored in the form of the table.

Further, as shown in Table 15, if the parameter combination in Table 13 is applicable only when rank<2 (where β in Table 13 may be referred to as β2), and the foregoing eight parameter combinations about β1 are applicable when rank>2, the eight parameter combinations about β1 and the eight parameter combinations corresponding to Table 13 may be stored in one table. For example, there may be at least one of the following configurations:

TABLE 15

|  | $M_v$ | α | Rank < 2 β2 | Rank > 2 β1 |
|---|---|---|---|---|
| Configuration1 | 1 | 1 | 1 | 0.5 |
| Configuration2 | 1 | 1 | 0.75 | 0.375 |
| Configuration3 | 1 | 1 | 0.5 | 0.25 |
| Configuration4 | 1 | 0.5 | 0.75 | 0.375 |
| Configuration5 | 1 | 0.5 | 0.5 | 0.25 |
| Configuration6 | 1 | 0.5 | 0.25 | 0.125 |
| Configuration7 | 2 | 1 | 0.75 | 0.375 |
| Configuration8 | 2 | 1 | 0.5 | 0.25 |

In an optional example, eight possible parameter combinations are selected as follows:

$M_v$=1, α=1, and β1=0.75;
$M_v$=1, α=1, and β1=0.5;
$M_v$=1, α=1, and β1=0.25;
$M_v$=1, α=0.5, and β1=0.5;
$M_v$=1, α=0.5, and β1=0.25;
$M_v$=1, α=0.5, and β1=0.125;

$M_v=2$, $\alpha=1$, and $\beta 1=0.5$; and
$M_v=2$, $\alpha=1$, and $\beta 1=0.25$.

Similarly, the eight parameter combinations may be stored in the form of the table.

Further, if the parameter combination in Table 13 is applicable only when rank<2 (where $\beta$ in Table 13 may be referred to as $\beta 2$), and the foregoing eight parameter combinations about $\beta 1$ are applicable when rank>2, as shown in Table 16, the eight parameter combinations about $\beta 1$ and the eight parameter combinations corresponding to Table 13 may be stored in one table. For example, there may be at least one of the following configurations:

TABLE 16

|  | $M_v$ | $\alpha$ | Rank < 2 $\beta 2$ | Rank > 2 $\beta 1$ |
| --- | --- | --- | --- | --- |
| Configuration1 | 1 | 1 | 1 | 0.75 |
| Configuration2 | 1 | 1 | 0.75 | 0.5 |
| Configuration3 | 1 | 1 | 0.5 | 0.25 |
| Configuration4 | 1 | 0.5 | 0.75 | 0.5 |
| Configuration5 | 1 | 0.5 | 0.5 | 0.25 |
| Configuration6 | 1 | 0.5 | 0.25 | 0.125 |
| Configuration7 | 2 | 1 | 0.75 | 0.5 |
| Configuration8 | 2 | 1 | 0.5 | 0.25 |

When there are eight parameter combinations, only three bits are needed for indication. CSI resource overheads occupied by the network device to indicate the first parameter combination can be reduced. In addition, the reporting overheads of the UE are controlled based on the foregoing eight parameter combinations, so that a quantity of selected non-zero elements fluctuates in a large range, and the reporting overheads of the UE fluctuate within a proper range. The eight parameter combinations are parameter combinations with good performance in configurations with similar reporting overheads of the UE.

For a ternary parameter combination configuration of $\{\alpha, \beta, M_v\}$, a value of a frequency domain component $M_v$ is selected from candidate frequency domain components whose window length is N indicated by the network device to the terminal device. When $M_v=1$, a value of N may be 1 or 2; and when $M_v=2$, a value of N may be 2 or any one of $\{3, 4, 5\}$. Although the value of N does not directly determine the maximum quantity of non-zero elements, different values of N may bring some constraints in application scenarios, which may indirectly determine an application scenario of the ternary parameter combination configuration $\{\alpha, \beta, M_v\}$. For example, when uplink and downlink channel angle delay reciprocity is poor, $M_v$ in the first parameter combination sent by the network device to the terminal device meets $N>M_v$; or when uplink and downlink channel angle delay reciprocity is good, $M_v$ in the first parameter combination sent by the network device to the terminal device meets $N=M_v$. Therefore, the value of N is also a factor that needs to be considered when the ternary parameter combination is discussed. To be specific, the ternary parameter combination changes to a quaternary parameter combination $(\alpha, N, \beta, M_v)$ under a specific condition. The plurality of parameter combinations may further include the value of N. The first parameter combination may further include a first value of N.

The parameter N is introduced into the parameter combination, and the value of N may be determined based on different scenarios. In other words, the network device may indicate different parameter combinations to the terminal device based on different scenarios.

It should be noted that $M_{v1}$, $M_{v2}$, $M_{v3}$, . . . mentioned below are for distinguishing between values of $M_v$ in different combinations, and $\alpha_1$, $\alpha_2$, $\alpha_3$, . . . mentioned below are also for distinguishing between values of $\alpha$ in different combinations, and are irrelevant to $\alpha_1$ and $\alpha_2$ in the foregoing related rank. $\beta_1$, $\beta_2$, $\beta_3$, . . . mentioned below are also for distinguishing between values of $\alpha$ in different combinations, and are irrelevant to $\beta_1$ and $\beta_2$ in the foregoing related rank.

For the ternary parameter combination configuration of $\{\alpha, \beta, M_v\}$, some parameter combination configurations correspond to the same reporting overheads of the UE, but the system performance is different. Therefore, in consideration of the overheads and performance of the system, some parameter combinations with high reporting overheads of the UE but poor performance may be deleted. In this case, this application proposes some design rules, so that some parameter combinations with similar overheads but large performance differences can be selected.

In an example, for a parameter combination $M_{v1}=1$, $\alpha_1=1$, and $\beta_1=\{0.25,0.5,0.75,1\}$, a parameter combination $M_{v2}=1$, $\alpha_2=0.75$, and $\beta_2=\{0.25,0.5,0.75,1\}$, and a parameter combination $M_{v3}=1$, $\alpha_3=0.5$ and $\beta_3=\{0.25,0.5,0.75,1\}$, when $\alpha_1\beta_1=\alpha_2\beta_2=\alpha_3\beta_3$, maximum quantities of non-zero elements obtained by the three are the same. To balance the system performance and the overheads, the following describes how to select a parameter combination.

For example, a parameter combination $M_{v2}=1$ and $\alpha_2=0.75$ and a parameter combination $M_{v1}=1$ and $\alpha_1=1$ are used as an example, and terminal reporting overheads corresponding to the two parameter combinations are close. When $\alpha_1=1$, all ports (for example, 32 ports) are used. However, when $\alpha_2=0.75$, ¾ ports need to be selected from all the ports (for example, 32 ports), and the selected ports are reported to the network device. For terminal reporting, in comparison with $\alpha_1=1$, for $\alpha_2=0.75$, port reporting overheads need to be newly added. In addition, if the ports selected in two polarization directions are the same, in comparison with $\alpha_1=1$, for $\alpha_2=0.75$, a performance loss is also caused. A reason is that when the ports selected in the two polarization directions are different, ¾ ports may be selected from all the ports. When the ports selected in the two polarization directions are the same, ¾ ports can be selected only from ½ ports, a port selection possibility is reduced, and the performance is reduced. Parameter configurations of $M_{v2}=1$, $\alpha_2=0.75$, and $\beta_2=\{0.25,0.5,0.75,1\}$ can be deleted.

For example, a parameter combination $M_{v2}=1$ and $\alpha_2=0.75$ and a parameter combination $M_{v3}=1$ and $\alpha_3=0.5$ are used as an example. Terminal reporting overheads corresponding to the two parameter combinations are close. In comparison with $\alpha_3=0.5$, for $\alpha_2=0.75$, a quantity of non-zero elements reported by the terminal is large, and overheads indicated by a non-zero element location are large. Parameter configurations of $M_{v2}=1$, $\alpha_2=0.75$, and $\beta_2=\{0.25,0.5, 0.75,1\}$ can be deleted.

Therefore, in comprehensive consideration of the performance and overheads, the parameter configurations of $M_{v2}=1$, $\alpha_2=0.75$, and $\beta_2=\{0.25,0.5,0.75,1\}$ can be deleted. In this application, it is considered that a final ternary parameter combination in R17 is selected from parameter combinations $\{M_{v1}=1, \alpha_1=1\}$ and $\{M_{v3}=1, \alpha_3=0.5\}$, and a value set of $\beta$ corresponding to the several parameter combinations is $\beta=\{0.25,0.5,0.75,1\}$.

In an example, on a basis of the foregoing three combinations, a parameter combination $M_{v4}=2$, $\alpha_4=1$, and $\beta_4=\{0.25,0.5,0.75,1\}$ is further introduced. If the parameter combination $M_{v4}=2$, $\alpha_4=1$, and $\beta_4=\{0.25,0.5,0.75,1\}$, the parameter combination $M_{v2}=1$, $\alpha_2=0.75$, and $\beta_2=\{0.25,0.5,0.75,1\}$, and the parameter combination $M_{v1}=1$, $\alpha_1=1$, and $\beta_1=\{0.25,0.5,0.75,1\}$ are compared, from a perspective of better performance and terminal reporting overheads, the parameter combination $M_{v2}=1$, $\alpha_2=0.75$, and $\beta_2=\{0.25,0.5,0.75,1\}$ can be deleted from the three parameter combinations. Therefore, in this application, it is considered that the final ternary parameter combination in R17 is selected from the parameter combinations $\{M_{v1}=1, \alpha_1=1\}$, $\{M_{v3}=1, \alpha_3=0.5\}$, and $\{M_{v4}=2, \alpha_4=1\}$, and the value set of $\beta$ corresponding to the several parameter combinations is $\beta=\{0.25,0.5,0.75,1\}$.

In an example, for a parameter combination $M_{v1}=2$, $\alpha_2=0.5$, and $\beta_1=\{0.25,0.5,0.75,1\}$ and a parameter combination $M_{v2}=1$, $\alpha_2=1$, and $\beta_2=\{0.25,0.5,0.75,1\}$, when $\beta_1=\beta_2$, maximum quantities of non-zero elements corresponding to the two parameter combinations are the same. In a conventional technology, a same port is selected for two polarization directions of the parameter combination $\{M_{v1}=2, \alpha_2=0.5\}$, and a same port is also selected for different layers. This causes a partial performance loss. Therefore, the final parameter combination is selected from the parameter combination $\{M_{v2}=1, \alpha_2=1, \beta_2=\{0.25,0.5,0.75,1\}\}$.

In addition, this embodiment further provides some parameter combination selection methods. For example, when $M_v$ is the same, it needs to be ensured that different parameter combinations correspond to different $\alpha*\beta$. For example, $\alpha_1\beta_1 \neq \alpha_2\beta_2$. Because maximum quantities of non-zero elements obtained by the two are the same, and overheads of the two are similar, a parameter combination with better performance is selected.

In addition, when $\beta$ is the same, it needs to be ensured that different parameter combinations correspond to different $\alpha*M_v$. For example, $\alpha_1 M_{v1} \neq \alpha_2 M_{v2}$. Because maximum quantities of non-zero elements obtained by the two parameter combinations are the same, but for the parameter combination with a large $M_v$, when port selection is performed, a plurality of frequency domain components correspond to the same port, and a degree of freedom for selecting a non-zero element is poorer than that for selecting the parameter combination with small $M_v$. This causes a system performance difference.

As described above, the first value of $\alpha$ is for determining the quantity $K_1$ of rows of the first coefficient matrix. In an optional example, the first value of $\alpha$ is the first value of $K_1$. In other words, the quantity of rows of the first coefficient matrix is the first value of $\alpha$. The value set of $K_1$ is $K_1=\{2,4,8,12,16,24,32\}$. The value set of $\alpha$ is $\alpha=\{2,4,8,12,16,24,32\}$.

As described above, $K_0=\lceil \beta K_1 M_v \rceil$, the value set of $M_v$ is $M_v=\{1,2\}$, the value set of $\beta$ is $\beta=\{0.25,0.5,0.75,1\}$, the value set of $K_1$ is $K_1=\{2,4,8,12,16,24,32\}$, and the value set of P is $P=\{4,8,12,16,24,32\}$. For each value of P, there are 56 parameter combinations.

If in a process of determining $K_0$, $K_1$ is required to be less than or equal to P, details are as follows:

for P=4, there are two values of $K_1$, corresponding to 16 parameter combinations;

for P=8, there are three values of $K_1$, corresponding to 24 parameter combinations;

for P=12, there are four values of $K_1$, corresponding to 32 parameter combinations;

for P=16, there are five values of $K_1$, corresponding to 40 parameter combinations;

for P=24, there are six values of $K_1$, corresponding to 48 parameter combinations; and for P=32, there are seven values of $K_1$, corresponding to 56 parameter combinations.

In this application, some values of $K_1$ are selected from the value set of $K_1$ (for example, the value set of $K_1$ is $K_1=\{2,4,8,12,16,24,32\}$) based on the parameter $\alpha$ and the parameter P of the quantity of CSI-RS ports, to select some parameter combinations from the plurality of parameter combinations.

In an optional example, when $\alpha*P-K_1 \leq 0$ is met, the value of $K_1$ may be a value of $K_1$ when $\alpha$ result of $\alpha*P-K_1$ is the largest, may be represented by $$\underset{K_1}{\mathrm{argmax}}\{\alpha * P - K_1 \geq 0\},$$

and is subsequently referred to as $K_1$ obtained based on $\max\{\alpha*P-K_1 \leq 0\}$. It may also be understood as that the first value of $K_1$ is a value of $K_1$ that is greater than or equal to $\alpha*P$ and for which an absolute value of a difference between $\alpha*P$ and $K_1$ is the smallest in a value set of $K_1$. The set of values to which $K_1$ can be set is $K_1=\{2,4,8,12,16,24,32\}$.

In an optional example, when $\alpha*P-K_1 \geq 0$ is met, the first value of $K_1$ is a value of $K_1$ when a result of $\alpha*P-K_1$ is the smallest, may be represented by $$\underset{K_1}{\mathrm{argmin}}\{\alpha * P - K_1 \geq 0\},$$

and is subsequently referred to as $K_1$ obtained based on $\min\{\alpha*P-K_1 \geq 0\}$. Alternatively, it may be understood as that the first value of $K_1$ is a value of $K_1$ that is less than or equal to $\alpha*P$ and for which an absolute value of a difference between $\alpha*P$ and $K_1$ is the smallest in a value set of $K_1$. The set of values to which $K_1$ can be set is $K_1=\{2,4,8,12,16,24,32\}$.

In this filtering manner, it can be ensured that the value of $K_1$ obtained through filtering is still a value of $K_1$ in an existing value set (for example, $K_1=\{2,4,8,12,16,24,32\}$).

Based on $\alpha=\{0.25,0.5,0.75,1\}$, $K_1=\{2,4,8,12,16,24,32\}$, and $P=\{4,8,12,16,24,32\}$, the following examples are provided:

For example, when $\alpha=1$, and P=32, a value of $K_1$ obtained based on $\max\{\alpha*P-K_1 \leq 0\}$ is 32, and a value of $K_1$ obtained based on $\min\{\alpha*P-K_1 \geq 0\}$ is 32.

For example, when $\alpha=0.75$, and P=32, a value of $K_1$ obtained based on $\max\{\alpha*P-K_1 \leq 0\}$ is 24, and a value of $K_1$ obtained based on $\min\{\alpha*P-K_1 \geq 0\}$ is 24.

For example, when $\alpha=0.5$, and P=32, a value of $K_1$ obtained based on $\max\{\alpha*P-K_1 \leq 0\}$ is 16, and a value of $K_1$ obtained based on $\min\{\alpha*P-K_1 \geq 0\}$ is 16.

For example, when $\alpha=0.25$, and P=32, a value of $K_1$ obtained based on $\max\{\alpha*P-K_1 \leq 0\}$ is 8, and a value of $K_1$ obtained based on $\min\{\alpha*P-K_1 \geq 0\}$ is 8.

It can be learned that, for P=32, a quantity of values of $K_1$ are reduced from 7 to 4, and there are 32 parameter combinations corresponding to the values of $K_1$.

For example, when $\alpha=1$, and P=24, a value of $K_1$ obtained based on $\max\{\alpha*P-K_1 \leq 0\}$ is 24, and a value of $K_1$ obtained based on $\min\{\alpha*P-K_1 \geq 0\}$ is 24.

For example, when $\alpha=0.75$, and P=24, a value of $K_1$ obtained based on $\max\{\alpha*P-K_1 \leq 0\}$ is 24, and a value of $K_1$ obtained based on $\min\{\alpha*P-K_1 \geq 0\}$ is 16.

For example, when $\alpha=0.5$, and $P=24$, a value of $K_1$ obtained based on $\max\{\alpha*P-K_1\leq 0\}$ is 12, and a value of $K_1$ obtained based on $\min\{\alpha*P-K_1\geq 0\}$ is 12.

For example, when $\alpha=0.25$, and $P=24$, a value of $K_1$ obtained based on $\max\{\alpha*P-K_1\leq 0\}$ is 8, and a value of $K_1$ obtained based on $\min\{\alpha*P-K_1\geq 0\}$ is 4.

It can be learned that, for $P=24$, there are three values of $K_1$ determined based on $\max\{\alpha*P-K_1\leq 0\}$ (where when $K_1$ is required to be less than or equal to P, there are six values of $K_1$ in an existing solution), corresponding to 24 parameter combinations. There are four values of $K_1$ determined based on $\min\{\alpha*P-K_1\geq 0\}$ (where there are six values of $K_1$ in an existing solution), corresponding to 32 parameter combinations.

For example, when $\alpha=1$, and $P=12$, a value of $K_1$ obtained based on $\max\{\alpha*P-K_1\leq 0\}$ is 12, and a value of $K_1$ obtained based on $\min\{\alpha*P-K_1\geq 0\}$ is 12.

For example, when $\alpha=0.75$, and $P=12$, a value of $K_1$ obtained based on $\max\{\alpha*P-K_1\leq 0\}$ is 12, and a value of $K_1$ obtained based on $\min\{\alpha*P-K_1\geq 0\}$ is 8.

For example, when $\alpha=0.5$, and $P=12$, a value of $K_1$ obtained based on $\max\{\alpha*P-K_1\leq 0\}$ is 8, and a value of $K_1$ obtained based on $\min\{\alpha*P-K_1\geq 0\}$ is 4.

For example, when $\alpha=0.25$, and $P=12$, a value of $K_1$ obtained based on $\max\{\alpha*P-K_1\leq 0\}$ is 4, and a value of $K_1$ obtained based on $\min\{\alpha*P-K_1\geq 0\}$ is 2.

It can be learned that, for $P=12$, there are three values of $K_1$ determined based on $\max\{\alpha*P-K_1\leq 0\}$ (where when $K_1$ is required to be less than or equal to P, there are four values of $K_1$ in an existing solution), corresponding to 24 parameter combinations.

In an optional example, when the value of $\alpha$ is small, for example, when $\alpha=0.25$, the value of $K_1$ may be obtained based on $\max\{\alpha*P-K_1\leq 0\}$. In this way, it can be ensured that a value of $K_1$ can be obtained when the value of P is small. For example, when $P=4$, based on $\max\{\alpha*P-K_1\leq 0\}$, it may be determined that a value of $K_1$ is 2 from the set $K_1=\{2,4,8,12,16,24,32\}$.

In an optional example, when the value of $\alpha$ is large, for example, when $\alpha=0.5$, 0.75, or 1, the value of $K_1$ may be obtained based on $\min\{\alpha*P-K_1\geq 0\}$. In this way, a probability that the same value of $K_1$ is obtained for different values of $\alpha$ can be reduced. For example, when $P=12$ or 24, for different values of $\alpha$, values of $K_1$ obtained based on $\min\{\alpha*P-K_1\geq 0\}$ are all different.

In an optional example, the value of $K_1$ may be $K_1=\lceil\alpha*P\rceil$, for example, $\alpha=\{0.25,0.5,0.75,1\}$, and $P=\{4,8,12,16,24,32\}$, where $\lceil\ \rceil$ represents rounding up. In this way, a relationship between P and $K_1$ can be simplified.

When the value of P is 12, 24, or 32, possibilities of the values of $K_1$ are reduced, and the quantity of parameter combinations is also reduced.

The foregoing describes the method in embodiments of this application, and the following describes an apparatus in embodiments of this application. The method and the apparatus are based on a same technical idea. The method and the apparatus have similar principles for resolving problems. Therefore, for implementations of the apparatus and the method, refer to each other. Details are not repeated herein.

In embodiments of this application, the apparatus may be divided into function modules based on the foregoing method examples. For example, the apparatus may be divided into function modules corresponding to functions, or two or more functions may be integrated into one module. These modules may be implemented in a form of hardware, or may be implemented in a form of a software function module. It should be noted that, in embodiments of this application, module division is an example, and is merely a logical function division. In a specific implementation, another division manner may be used.

Figure 4:
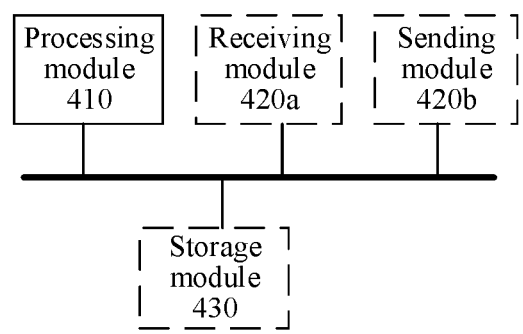
FIG. 4 is a diagram of a structure of a communication apparatus according to an embodiment of this application.

Based on the same technical concept as the foregoing method, FIG. 4 is a schematic diagram of a structure of a communication apparatus 400. The apparatus 400 may include a processing module 410, and optionally, further includes a receiving module 420a, a sending module 420b, and a storage module 430. The processing module 410 may be separately connected to the storage module 430, the receiving module 420a, and the sending module 420b, and the storage module 430 may also be connected to the receiving module 420a and the sending module 420b.

In an example, the receiving module 420a and the sending module 420b may alternatively be integrated, and are defined as a transceiver module.

In an example, the apparatus 400 may be a terminal device, or may be a chip or a functional unit used in a terminal device. The apparatus 400 has any function of the terminal device in the foregoing method. For example, the apparatus 400 can perform the steps performed by the terminal device in the method in FIG. 3.

The receiving module 420a may perform a receiving action performed by the terminal device in the foregoing method embodiments.

The sending module 420b may perform a transmitting action performed by the terminal device in the foregoing method embodiments.

The processing module 410 may perform an action other than the transmitting action and the receiving action in the actions performed by the terminal device in the foregoing method embodiments.

In an example, the receiving module 420a is configured to receive first indication information from a network device, where the first indication information indicates a first parameter combination, the first parameter combination is one of a plurality of parameter combinations, a quantity of the plurality of parameter combinations is less than or equal to 32, and each parameter combination includes values of at least two parameters in $M_v$, $\beta$, and $\alpha$; the first parameter combination includes at least two of the following: a first value of $M_v$, a first value of $\beta$, and a first value of $\alpha$; the first parameter combination is for determining that a first coefficient matrix to be indicated by the terminal device includes a maximum of $K_0$ non-zero elements, and $K_0$ is determined based on the first value of $M_v$, the first value of $\beta$, and the first value of $\alpha$; and the first value of $\alpha$ is for determining a quantity of rows of the first coefficient matrix, the first value of $M_v$ is a quantity of columns of the first coefficient matrix, the first value of $\beta$ is a proportion of non-zero elements to all elements in the first coefficient matrix, and the first coefficient matrix is for determining a precoding matrix; and the sending module 420b is configured to send second indication information to the network device, where the second indication information indicates $K_2$ non-zero elements in the first coefficient matrix, $K_2$ is less than or equal to $K_0$, and the indication information is determined based on a downlink reference signal from the network device.

In an example, the receiving module 420a is configured to receive third indication information from the network device, where the third indication information indicates a first quantity of ports used by the network device to send the downlink reference signal.

In an example, the storage module 430 may store computer-executable instructions of the method performed by the terminal device, so that the processing module 410, the receiving module 420a, and the sending module 420b perform the method performed by the terminal device in the foregoing example.

For example, the storage module may include one or more memories. The memory may be a component configured to store a program or data in one or more devices or circuits. The storage module may be a register, a cache, a RAM, or the like. The storage module may be integrated with the processing module. The storage module may be a ROM or another type of static storage device that can store static information and instructions. The storage module may be independent of the processing module.

The transceiver module may be an input/output interface, a pin, a circuit, or the like.

In an example, the apparatus 400 may be a network device, or may be a chip or a functional unit used in a network device. The apparatus 400 has any function of the network device in the foregoing method. For example, the apparatus 400 can perform the steps performed by the network device in the method in FIG. 3.

The receiving module 420a may perform a receiving action performed by the network device in the foregoing method embodiments.

The sending module 420b may perform a transmitting action performed by the network device in the foregoing method embodiments.

The processing module 410 may perform an action other than the transmitting action and the receiving action in the actions performed by the network device in the foregoing method embodiments.

In an example, the sending module 420b is configured to send first indication information to a terminal device, where the first indication information indicates a first parameter combination, the first parameter combination is one of a plurality of parameter combinations, a quantity of the plurality of parameter combinations is less than or equal to 32, and each parameter combination includes values of at least two parameters in $M_v$, $\beta$, and $\alpha$; the first parameter combination includes at least two of the following: a first value of $M_v$, a first value of $\beta$, and a first value of $\alpha$; the first parameter combination is for determining that a first coefficient matrix to be indicated by the terminal device includes a maximum of $K_0$ non-zero elements, and $K_0$ is determined based on the first value of $M_v$, the first value of $\beta$, and the first value of $\alpha$; and the first value of $\alpha$ is for determining a quantity of rows of the first coefficient matrix, the first value of $M_v$ is a quantity of columns of the first coefficient matrix, the first value of $\beta$ is a proportion of the non-zero elements to all elements in the first coefficient matrix, and the first coefficient matrix is for determining a precoding matrix; and the receiving module 420a is configured to receive second indication information from the terminal device, where the second indication information indicates $K_2$ non-zero elements in the first coefficient matrix, $K_2$ is less than or equal to $K_0$, and the indication information is determined based on a downlink reference signal from the network device.

The sending module 420b is configured to send third indication information to the terminal device, where the third indication information indicates a first quantity of ports used by the network device to send the downlink reference signal.

In an example, the storage module 430 may store computer-executable instructions of the method performed by the network device, so that the processing module 410, the receiving module 420a, and the sending module 420b perform the method performed by the network device in the foregoing example.

For example, the storage module may include one or more memories. The memory may be a component configured to store a program or data in one or more devices or circuits. The storage module may be a register, a cache, a RAM, or the like. The storage module may be integrated with the processing module. The storage module may be a ROM or another type of static storage device that can store static information and instructions. The storage module may be independent of the processing module.

The transceiver module may be an input/output interface, a pin, a circuit, or the like.

As a possible product form, the apparatus may be implemented using a general bus architecture.

Figure 5:
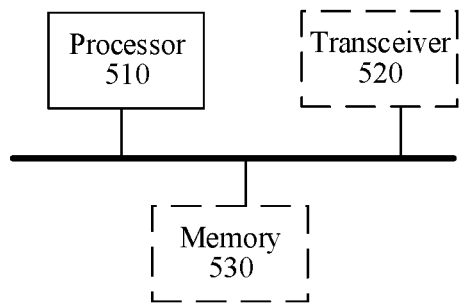
FIG. 5 is a diagram of a structure of a communication apparatus according to an embodiment of this application.

FIG. 5 is a schematic block diagram of a communication apparatus 500.

The apparatus 500 may include a processor 510, and optionally, further include a transceiver 520 and a memory 530. The transceiver 520 may be configured to receive a program or instructions and transmit the program or the instructions to the processor 510. Alternatively, the transceiver 520 may be configured to perform communication interaction between the apparatus 500 and another communication device, for example, exchange control signaling and/or service data. The transceiver 520 may be a code and/or data read/write transceiver, or the transceiver 520 may be a signal transmission transceiver between the processor and the transceiver. The processor 510 and the memory 530 are electrically coupled.

In an example, the apparatus 500 may be a terminal device, or may be a chip used in a terminal device. It should be understood that the apparatus has any function of the terminal device in the foregoing method. For example, the apparatus 500 can perform the steps performed by the terminal device in the method in FIG. 3. For example, the memory 530 is configured to store a computer program. The processor 510 may be configured to: invoke the computer program or instructions stored in the memory 530, to perform the method performed by the terminal device in the foregoing example, or perform, by using the transceiver 520, the method performed by the terminal device in the foregoing example.

In an example, the apparatus 500 may be a network device, or may be a chip used in a network device. It should be understood that the apparatus has any function of the network device in the foregoing method. For example, the apparatus 500 can perform the steps performed by the network device in the method in FIG. 3. For example, the memory 530 is configured to store a computer program. The processor 510 may be configured to: invoke the computer program or instructions stored in the memory 530, to perform the method performed by the network device in the foregoing example, or perform, by using the transceiver 520, the method performed by the network device in the foregoing example.

The processing module 410 in FIG. 4 may be implemented by using the processor 510.

The receiving module 420a and the sending module 420b in FIG. 4 may be implemented by using the transceiver 520. Alternatively, the transceiver 520 includes a receiver and a transmitter. The receiver performs a function of the receiving module, and the transmitter performs a function of the sending module.

The storage module 430 in FIG. 4 may be implemented by using the memory 530.

As a possible product form, the apparatus may be implemented by a general-purpose processor (where the general-purpose processor is also referred to as a chip or a chip system).

In a possible implementation, a general-purpose processor that implements the apparatus used in the terminal device or the apparatus used in the network device includes a processing circuit (where the processing circuit may also be referred to as a processor), and optionally, further includes an input/output interface and a storage medium (where the storage medium may also be referred to as a memory) for internal connection to and communication with the processing circuit. The storage medium is configured to store instructions executed by the processing circuit, to perform the method performed by the terminal device or the network device in the foregoing example.

The processing module 410 in FIG. 4 may be implemented by using the processing circuit.

The receiving module 420a and the sending module 420b in FIG. 4 may be implemented by using the input/output interface. Alternatively, the input/output interface includes an input interface and an output interface. The input interface performs a function of the receiving module, and the output interface performs a function of the sending module.

The storage module 430 in FIG. 4 may be implemented by using the storage medium.

As a possible product form, the apparatus in embodiments of this application may be further implemented by using one or more FPGAs (field-programmable gate arrays), a PLD (programmable logic device), a controller, a state machine, a gate logic, a discrete hardware component, any other proper circuit, or any combination of circuits that can perform various functions described in this application.

An embodiment of this application further provides a computer-readable storage medium that stores a computer program. When the computer program is executed by a computer, the computer is enabled to perform the foregoing communication method. In other words, the computer program includes instructions used for implementing the foregoing communication method.

An embodiment of this application further provides a computer program product, including computer program code. When the computer program code is run on a computer, the computer is enabled to perform the communication method provided above.

An embodiment of this application further provides a communication system. The communication system includes a first terminal device and a network device that perform the foregoing communication method.

In addition, the processor mentioned in embodiments of this application may be a central processing unit (CPU) or a baseband processor. The baseband processor and the CPU may be integrated or separated, or may be a network processor (NP) or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) and another programmable logic device, a discrete gate or a transistor logic device, a discrete hardware component, or the like, or any combination thereof. The general-purpose processor may be a microprocessor, or the processor may be any conventional processor or the like.

The memory mentioned in embodiments of this application may be a volatile memory or a non-volatile memory, or may include a volatile memory and a non-volatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Byway of example, and not description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application aims to include but is not limited to these memories and any memory of another proper type.

The transceiver mentioned in embodiments of this application may include a separate transmitter and/or a separate receiver, or the transmitter and the receiver may be integrated. The transceiver may operate based on an indication of a corresponding processor. Optionally, the transmitter may correspond to a transmitter machine in a physical device, and the receiver may correspond to a receiver machine in the physical device.

Persons of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. Persons of ordinary skill in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or some of the technical solutions may be represented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk drive, a read-only memory (ROM), a random access memory (RAM), a magnetic disk, or an optical disc.

The term "and/or" in this application describes an association relationship for describing associated objects and represents that three relationships may exist. For example, A and/or B may represent the following three cases: Only A exists, both A and B exist, and only B exists. The character "/" generally indicates an "or" relationship between the associated objects. "A plurality of" in this application means two or more. In addition, it should be understood that in descriptions of this application, terms such as "first" and "second" are merely used for distinguishing and description, but should not be understood as indicating or implying relative importance, or should not be understood as indicating or implying a sequence.

Although some example embodiments of this application have been described, persons skilled in the art can make changes and modifications to these embodiments once they learn the basic inventive concept. Therefore, the following claims are intended to be construed as to cover the example embodiments and all changes and modifications falling within the scope of this application.

It is clear that persons skilled in the art can make various modifications and variations to embodiments of this application without departing from the spirit and scope of embodiments of this application. In this way, this application is intended to cover these modifications and variations to embodiments of this application provided that they fall within the scope of protection defined by the following claims and their equivalent technologies of this application.

What is claimed is:

1. A method, comprising:
   receiving first indication information from a network device, wherein:
   the first indication information indicates a first parameter combination,
   the first parameter combination is one of a plurality of parameter combinations,
   a quantity of the plurality of parameter combinations is less than 24,
   each parameter combination of the plurality of parameter combinations comprises values of at least two parameters in $M_v$, $\beta$, and $\alpha$,
   the first parameter combination comprises at least two of the following: a first value of $M_v$, a first value of $\beta$, and a first value of $\alpha$,
   the first parameter combination is configured to be used to determine a maximum of $K_0$ non-zero elements for a first coefficient matrix,
   $K_0$ is determined based on the first value of $M_v$, the first value of $\beta$, and the first value of $\alpha$,
   the first value of $\alpha$ is configured to be used to determine a quantity of rows of the first coefficient matrix,
   the first value of $M_v$ is a quantity of columns of the first coefficient matrix,
   the first value of $\beta$ is a proportion of non-zero elements to all elements in the first coefficient matrix, and
   the first coefficient matrix is configured to be used to determine a precoding matrix; and
   sending second indication information to the network device, wherein the second indication information indicates $K_2$ non-zero elements in the first coefficient matrix, $K_2$ is less than or equal to $K_0$, and the indication information is determined based on a downlink reference signal from the network device.

2. The method according to claim 1, wherein:
   $K_0$ is determined based on the first value of $M_v$, the first value of $\beta$, and a first value of $K_1$;
   the first value of $K_1$ is the quantity of rows of the first coefficient matrix; and
   the first value of $K_1$ is determined based on the first value of $\alpha$.

3. The method according to claim 2, wherein:
   the first value of $K_1$ is determined based on the first value of $\alpha$ and a first value of P; and
   the first value of P is a first quantity of ports used by the network device to send the downlink reference signal.

4. The method according to claim 3, further comprising:
   receiving third indication information from the network device, wherein the third indication information indicates the first quantity of ports used by the network device to send the downlink reference signal.

5. The method according to claim 3, wherein:
   a value set of a quantity P of ports is P={4,8,12,16,24,32}; and
   a value of the first quantity belongs to the value set of the quantity P of ports.

6. The method according to claim 3, wherein:
   the first value of $K_1$ is a value of $K_1$ that is greater than or equal to $\alpha*P$ and for which an absolute value of a difference between $\alpha*P$ and $K_1$ is the smallest in a value set of $K_1$; or
   the first value of $K_1$ is a value of $K_1$ that is less than or equal to $\alpha*P$ and for which an absolute value of a difference between $\alpha*P$ and $K_1$ is the smallest in a value set of $K_1$; or
   the first value of $K_1$ satisfies a formula: $K_1=\lceil \alpha*P \rceil$, wherein $\lceil \ \rceil$ represents rounding up.

7. The method according to claim 1, wherein the quantity of the plurality of parameter combinations is 8.

8. The method according to claim 1, wherein the first parameter combination is:
   $M_v=1$, $\alpha=0.75$, and $\beta=0.5$;
   $M_v=1$, $\alpha=1$, and $\beta=0.5$;
   $M_v=1$, $\alpha=1$, and $\beta=0.75$;
   $M_v=1$, $\alpha=1$, and $\beta=1$;
   $M_v=2$, $\alpha=0.5$, and $\beta=0.5$;
   $M_v=2$, $\alpha=0.75$, and $\beta=0.5$;
   $M_v=2$, $\alpha=1$, and $\beta=0.5$; or
   $M_v=2$, $\alpha=1$, and $\beta=0.75$.

9. The method according to claim 8, wherein the first parameter combination of $M_v=2$, $\alpha=1$, and $\beta=0.75$ corresponds to the first quantity of ports used by the network device to send the downlink reference signal being less than 32.

10. The method according to claim 1, wherein the plurality of parameter combinations comprise at least one of the following:
$M_v=1$, $\alpha=0.75$, and $\beta=0.5$;
$M_v=1$, $\alpha=1$, and $\beta=0.5$;
$M_v=1$, $\alpha=1$, and $\beta=0.75$;
$M_v=1$, $\alpha=1$, and $\beta=1$;
$M_v=2$, $\alpha=0.5$, and $=0.5$;
$M_v=2$, $\alpha=0.75$, and $\beta=0.5$;
$M_v=2$, $\alpha=1$, and $\beta=0.5$; or
$M_v=2$, $\alpha=1$, and $\beta=0.75$.

11. The method according to claim 10, wherein the parameter combination of $M_v=2$, $\alpha=1$, and $\beta=0.75$, corresponds to a quantity of ports used by the network device to send the downlink reference signal being less than 32.

12. The method according to claim 1, wherein, in the plurality of parameter combinations, values of $\beta*\alpha$ corresponding to a plurality of parameter combinations in which $M_v$ has a same value are different.

13. The method according to claim 1, wherein, in the plurality of parameter combinations, a plurality of parameter combinations in which $M_v=1$ comprise at least two parameter combinations in which a value of $\beta$ is 1 or a value of $\alpha$ is 1.

14. The method according to claim 1, wherein, the plurality of parameter combinations are associated with values of at least two ranks.

15. An apparatus, comprising:
a processor; and
a memory coupled to the processor with instructions stored thereon, wherein the instructions, when executed by the processor, enable the apparatus to perform:
receiving first indication information from a network device, wherein:
the first indication information indicates a first parameter combination,
the first parameter combination is one of a plurality of parameter combinations,
a quantity of the plurality of parameter combinations is less than 24,
each parameter combination of the plurality of parameter combinations comprises values of at least two parameters in $M_v$, $\beta$, and $\alpha$,
the first parameter combination comprises at least two of the following: a first value of $M_v$, a first value of $\beta$, and a first value of $\alpha$,
the first parameter combination is configured to be used to determine a maximum of $K_0$ non-zero elements for a first coefficient matrix,
$K_0$ is determined based on the first value of $M_v$, the first value of $\beta$, and the first value of $\alpha$,
the first value of $\alpha$ is configured to be used to determine a quantity of rows of the first coefficient matrix,
the first value of $M_v$ is a quantity of columns of the first coefficient matrix,
the first value of $\beta$ is a proportion of non-zero elements to all elements in the first coefficient matrix, and
the first coefficient matrix is configured to be used to determine a precoding matrix; and
sending second indication information to the network device, wherein the second indication information indicates $K_2$ non-zero elements in the first coefficient matrix, $K_2$ is less than or equal to $K_0$, and the indication information is determined based on a downlink reference signal from the network device.

16. The apparatus according to claim 15, wherein:
$K_0$ is determined based on the first value of $M_v$, the first value of $\beta$, and a first value of $K_1$;
the first value of $K_1$ is the quantity of rows of the first coefficient matrix; and
the first value of $K_1$ is determined based on the first value of $\alpha$.

17. The apparatus according to claim 16, wherein:
the first value of $K_1$ is determined based on the first value of $\alpha$ and a first value of P;
and the first value of P is a first quantity of ports used by the network device to send the downlink reference signal.

18. The apparatus according to claim 17, wherein the instructions, when executed by the processor, further enable the apparatus to perform:
receiving third indication information from the network device, wherein the third indication information indicates the first quantity of ports used by the network device to send the downlink reference signal.

19. The apparatus according to claim 17, wherein:
a value set of a quantity P of ports is P={4,8,12,16,24,32};
and a value of the first quantity belongs to the value set of the quantity P of ports.

20. The apparatus according to claim 17, wherein:
the first value of $K_1$ is a value of $K_1$ that is greater than or equal to $\alpha*P$ and for which an absolute value of a difference between $\alpha*P$ and $K_1$ is the smallest in a value set of $K_1$; or
the first value of $K_1$ is a value of $K_1$ that is less than or equal to $\alpha*P$ and for which an absolute value of a difference between $\alpha*P$ and $K_1$ is the smallest in a value set of $K_1$; or
the first value of $K_1$ satisfies a formula: $K_1=\lceil \alpha*P \rceil$, wherein $\lceil \ \rceil$ represents rounding up.

21. The apparatus according to claim 15, wherein the quantity of the plurality of parameter combinations is 8.

22. The apparatus according to claim 15, wherein the first parameter combination is:
$M_v=1$, $\alpha=0.75$, and $\beta=0.5$;
$M_v=1$, $\alpha=1$, and $\beta=0.5$;
$M_v=1$, $\alpha=1$, and $\beta=0.75$;
$M_v=1$, $\alpha=1$, and $\beta=1$;
$M_v=2$, $\alpha=0.5$, and $\beta=0.5$;
$M_v=2$, $\alpha=0.75$, and $\beta=0.5$;
$M_v=2$, $\alpha=1$, and $\beta=0.5$; or
$M_v=2$, $\alpha=1$, and $\beta=0.75$.

23. The apparatus according to claim 22, wherein the first parameter combination of $M_v=2$, $\alpha=1$, and $\beta=0.75$ corresponds to the first quantity of ports used by the network device to send the downlink reference signal being less than 32.

24. The apparatus according to claim 15, wherein the plurality of parameter combinations comprise at least one of the following:
$M_v=1$, $\alpha=0.75$, and $\beta=0.5$;
$M_v=1$, $\alpha=1$, and $\beta=0.5$;
$M_v=1$, $\alpha=1$, and $\beta=0.75$;
$M_v=1$, $\alpha=1$, and $\beta=1$;
$M_v=2$, $\alpha=0.5$, and $\beta=0.5$;
$M_v=2$, $\alpha=0.75$, and $\beta=0.5$;
$M_v=2$, $\alpha=1$, and $\beta=0.5$; or
$M_v=2$, $\alpha=1$, and $\beta=0.75$.

25. The apparatus according to claim 24, wherein the parameter combination of $M_v=2$, $\alpha=1$, and $\beta=0.75$, corresponds to a quantity of ports used by the network device to send the downlink reference signal being less than 32.

26. The apparatus according to claim 15, wherein, in the plurality of parameter combinations, values of $\beta*\alpha$ corresponding to a plurality of parameter combinations in which $M_v$ has a same value are different.

27. The apparatus according to claim 15, wherein, in the plurality of parameter combinations, a plurality of parameter combinations in which $M_v=1$ comprise at least two parameter combinations in which a value of $\beta$ is 1 or a value of $\alpha$ is 1.

28. The apparatus according to claim 15, wherein the plurality of parameter combinations are associated with values of at least two ranks.

29. The apparatus according to claim 15, wherein the apparatus is a terminal device or a chip.

30. A non-transitory computer-readable storage medium with instructions stored thereon, wherein the instructions, when executed at least one processor, enable the at least one processor to perform:
  receiving first indication information from a network device, wherein:
    the first indication information indicates a first parameter combination,
    the first parameter combination is one of a plurality of parameter combinations,
    a quantity of the plurality of parameter combinations is less than 24,
    each parameter combination of the plurality of parameter combinations comprises values of at least two parameters in $M_v$, $\beta$, and $\alpha$,
    the first parameter combination comprises at least two of the following: a first value of $M_v$, a first value of $\beta$, and a first value of $\alpha$,
    the first parameter combination configured to be used to determine a maximum of $K_0$ non-zero elements for a first coefficient matrix,
    $K_0$ is determined based on the first value of $M_v$, the first value of $\beta$, and the first value of $\alpha$;
    the first value of $\alpha$ is configured to be used to determine a quantity of rows of the first coefficient matrix,
    the first value of $M_v$ is a quantity of columns of the first coefficient matrix,
    the first value of $\beta$ is a proportion of non-zero elements to all elements in the first coefficient matrix, and
    the first coefficient matrix is configured to be used to determine a precoding matrix; and
  sending second indication information to the network device, wherein the second indication information indicates $K_2$ non-zero elements in the first coefficient matrix, $K_2$ is less than or equal to $K_0$, and the indication information is determined based on a downlink reference signal from the network device.

* * * * *

UNITED STATES PATENT AND TRADEMARK OFFICE
CERTIFICATE OF CORRECTION

PATENT NO. : 12,500,632 B2  
APPLICATION NO. : 18/615384  
DATED : December 16, 2025  
INVENTOR(S) : Zhang et al.

Page 1 of 1

It is certified that error appears in the above-identified patent and that said Letters Patent is hereby corrected as shown below:

In the Claims

In Column 40, in Claim 17, Line 13, delete "a and a" and insert -- α and a --.

In Column 41, in Claim 27, Line 12, delete "αis" and insert -- α is --.

Signed and Sealed this  
Tenth Day of February, 2026

John A. Squires  
*Director of the United States Patent and Trademark Office*